US012666347B2

(12) United States Patent
Kim et al.

(10) Patent No.: US 12,666,347 B2
(45) Date of Patent: Jun. 23, 2026

(54) METHOD FOR TRANSMITTING AND RECEIVING SIB1 IN WIRELESS COMMUNICATION SYSTEM, AND DEVICE THEREFOR

(71) Applicant: LG ELECTRONICS INC., Seoul (KR)

(72) Inventors: Jaehyung Kim, Seoul (KR); Youngdae Lee, Seoul (KR); Seunggye Hwang, Seoul (KR); Sunghoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 18/552,872

(22) PCT Filed: Apr. 5, 2022

(86) PCT No.: PCT/KR2022/004883
§ 371 (c)(1),
(2) Date: Sep. 27, 2023

(87) PCT Pub. No.: WO2022/216010
PCT Pub. Date: Oct. 13, 2022

(65) Prior Publication Data
US 2025/0274846 A1 Aug. 28, 2025

(30) Foreign Application Priority Data
Apr. 6, 2021 (KR) ........................ 10-2021-0044824

(51) Int. Cl.
*H04W 72/12* (2023.01)
*H04L 5/00* (2006.01)
(Continued)

(52) U.S. Cl.
CPC ........... *H04W 48/10* (2013.01); *H04L 5/0053* (2013.01); *H04W 48/12* (2013.01)

(58) Field of Classification Search
CPC ....... H04W 48/10; H04W 48/12; H04W 8/24; H04W 48/02; H04W 72/04; H04W 8/22; H04W 88/02; H04L 5/0053; Y02D 30/70
See application file for complete search history.

(56) References Cited

U.S. PATENT DOCUMENTS

2022/0210806 A1* 6/2022 Rastegardoost ...... H04L 5/0094
2022/0377798 A1* 11/2022 Chien ................... H04L 1/1812
(Continued)

FOREIGN PATENT DOCUMENTS

KR 10-2020-0131891 11/2020
WO WO-2021190510 A1 * 9/2021 ........ H04W 74/0833

OTHER PUBLICATIONS

Nokia et al., "Higher layer support of Reduced Capability NR Devices," R1-2100500, 3GPP TSG-RAN WG1 Meeting #104-e, e-Meeting, Feb. 2021, 12 pages (Year: 2021).*
(Continued)

*Primary Examiner* — Lan-Huong Truong
(74) *Attorney, Agent, or Firm* — LEE, HONG, DEGERMAN, KANG & WAIMEY

(57) ABSTRACT

The present disclosure provides a method of transmitting and receiving SIB1 and a device therefor in a wireless communication system. The method performed by a Red-Cap UE may comprise receiving an MIB from a base station (BS) through a PBCH, receiving DCI from the BS based on the MIB, and receiving the SIB1 including cell barring information from the BS based on the DCI.

15 Claims, 13 Drawing Sheets

(51) Int. Cl.
  *H04W 48/10*       (2009.01)
  *H04W 48/12*       (2009.01)

(56)                References Cited

U.S. PATENT DOCUMENTS

2023/0319841 A1 *  10/2023  Ratasuk ................ H04L 1/0063
                                                    370/329
2024/0031056 A1 *   1/2024  Rastegardoost .. H04W 74/0833

OTHER PUBLICATIONS

PCT International Application No. PCT/KR2022/004883, International Search Report dated Jul. 25, 2022, 4 pages.
Nokia et al., "Higher layer support of Reduced Capability NR Devices," R1-2100500, 3GPP TSG-RAN WG1 Meeting #104-e, e-Meeting, Feb. 2021, 12 pages.
Denso Corporation, "Camping restriction and cell selection criterion," R2-2102947, 3GPP TSG-RAN WG2 #113bis-e, Apr. 2021, 3 pages.
Samsung, "Access control for RedCap UEs," R2-2103279, 3GPP TSG-RAN WG2 Meeting #113bis-e, Online, Apr. 2021, 2 pages.
ZTE "Access control and identification for Reduced Capability NR devices," R1-2007719, 3GPP TSG RAN WG1 #103-e, e-Meeting, Nov. 2020, 3 pages.

* cited by examiner

【FIG. 1】
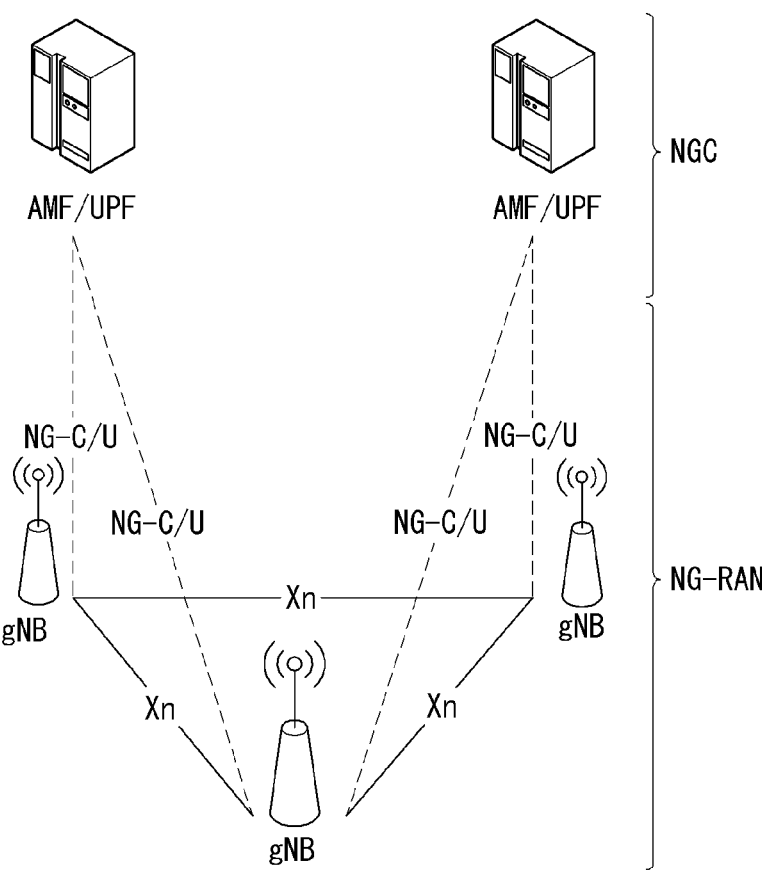
【FIG. 2】
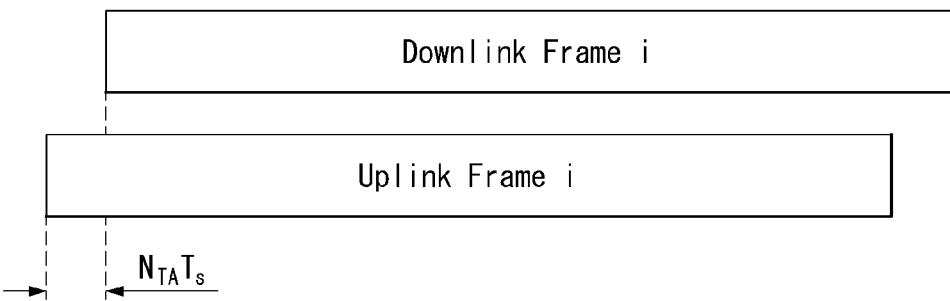

【FIG. 3】
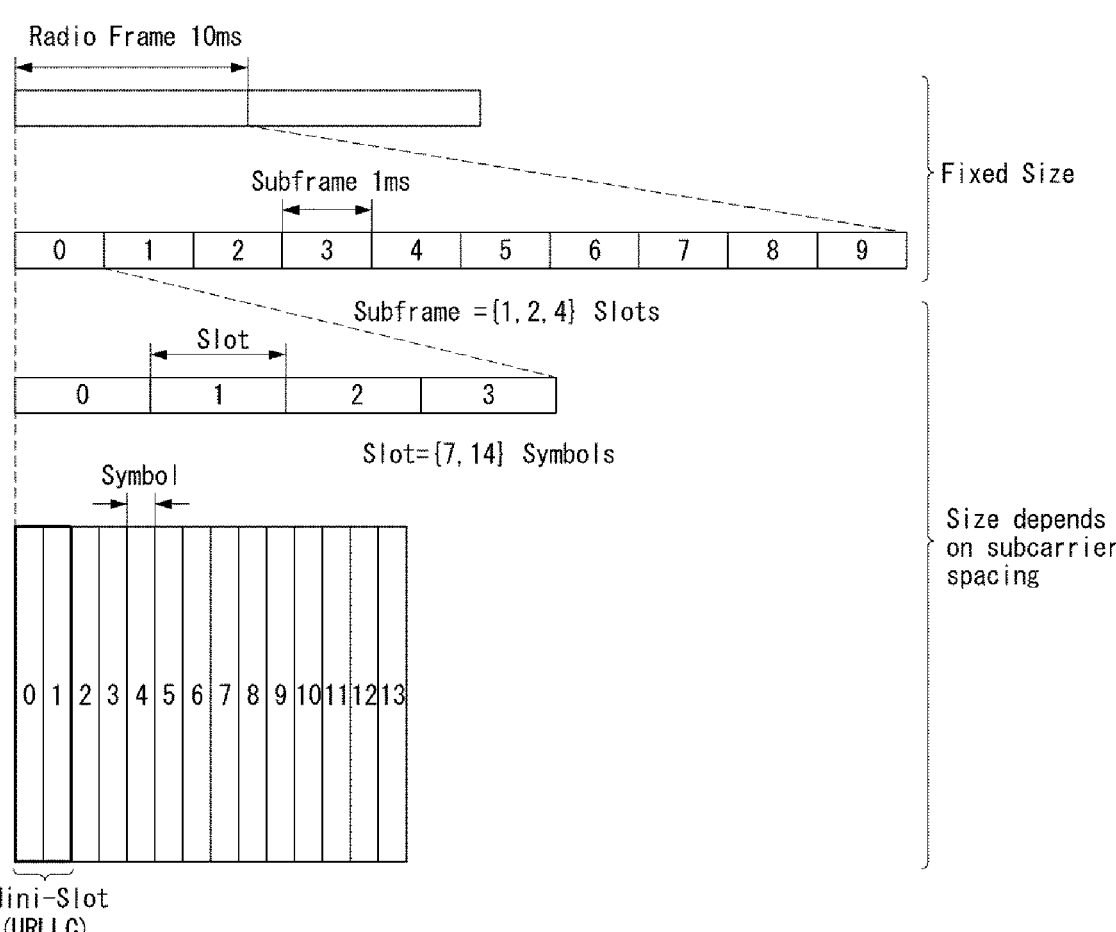
Radio Frame 10ms
Fixed Size
Subframe 1ms
| 0 | 1 | 2 | 3 | 4 | 5 | 6 | 7 | 8 | 9 |
Subframe ={1, 2, 4} Slots
Slot
| 0 | 1 | 2 | 3 |
Slot={7, 14} Symbols
Symbol
Size depends on subcarrier spacing
| 0 | 1 | 2 | 3 | 4 | 5 | 6 | 7 | 8 | 9 |10|11|12|13|
Mini-Slot
(URLLC)
Mini-Slot={2, 4, 7} Symbols — ffs 【FIG. 4】
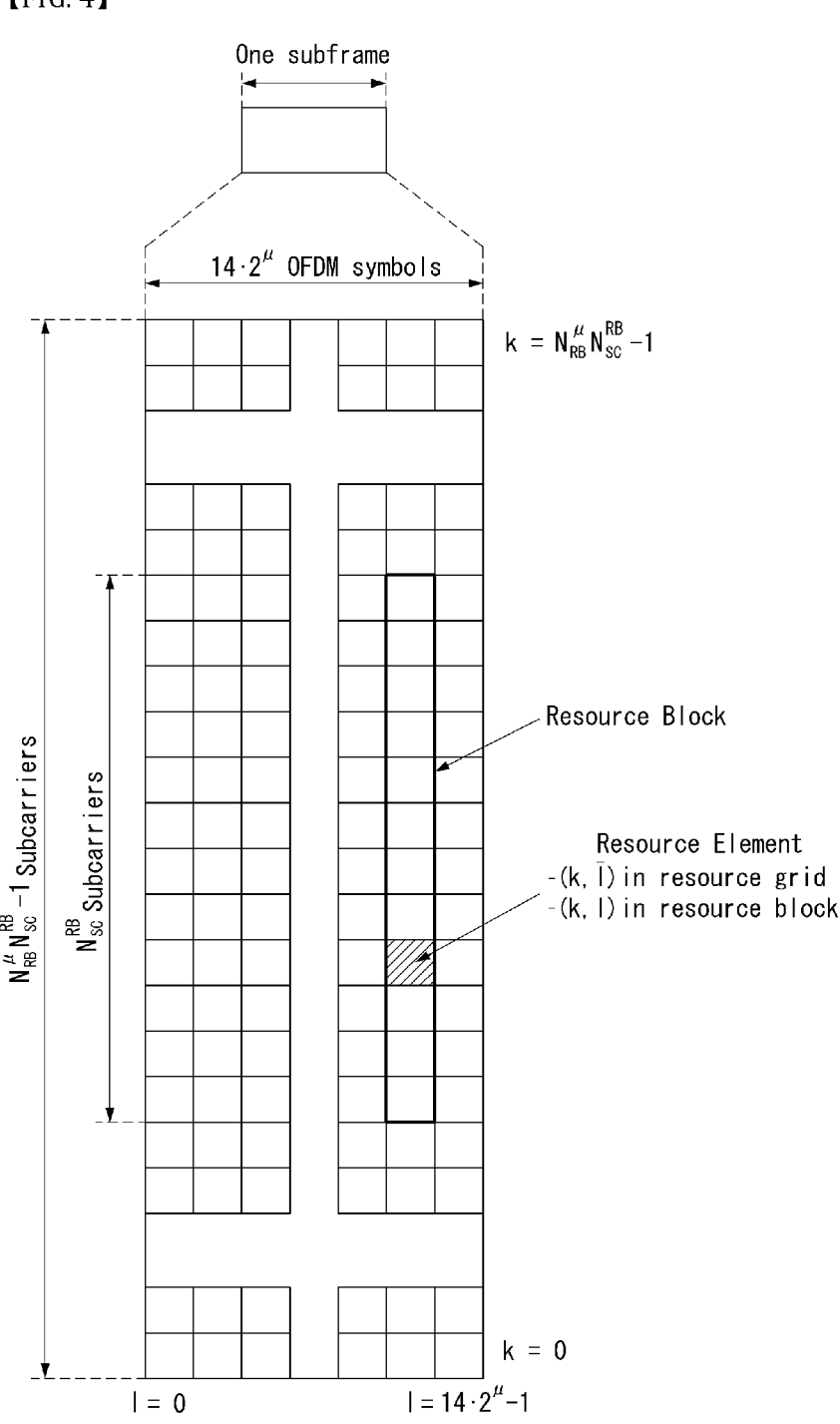

【FIG. 5】
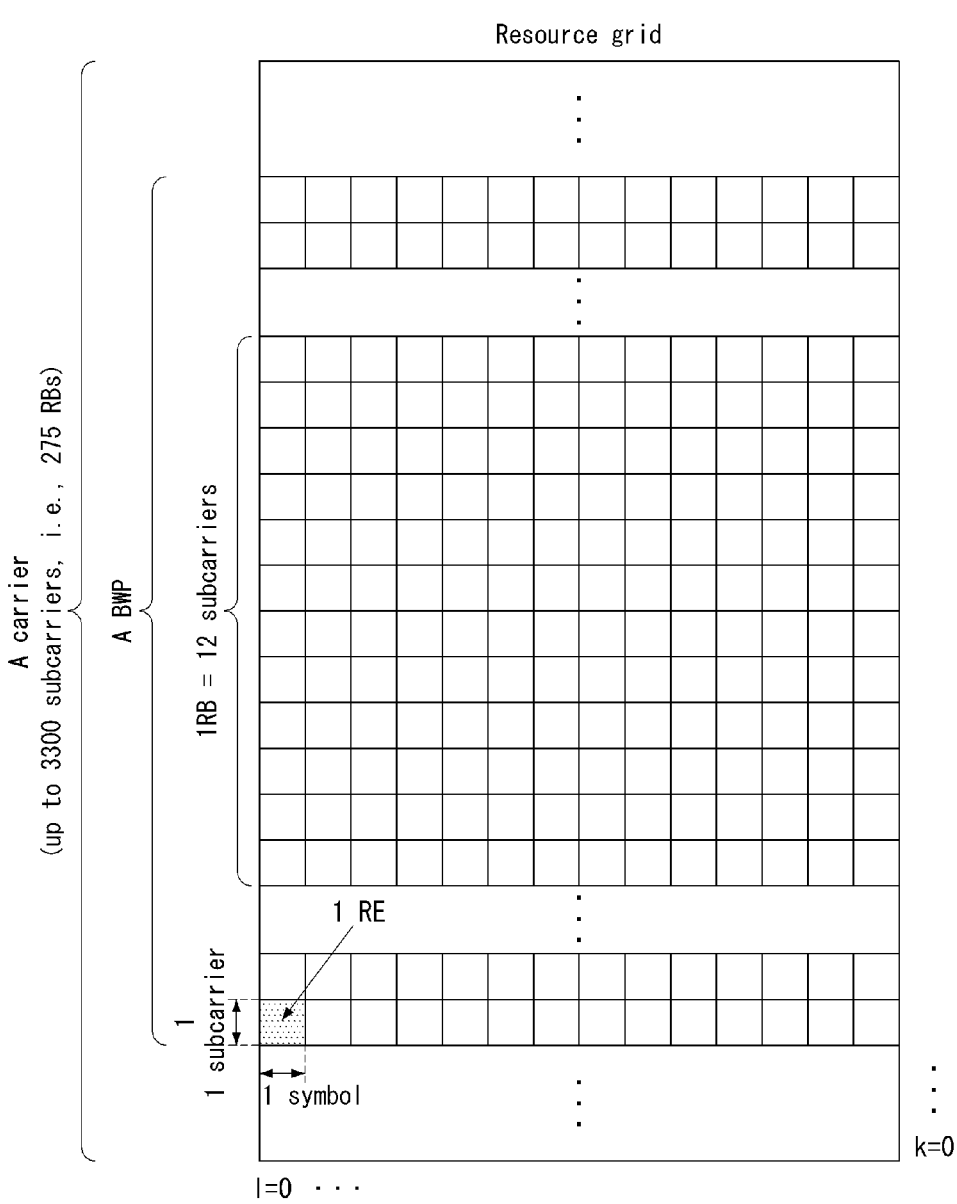

【FIG. 6】

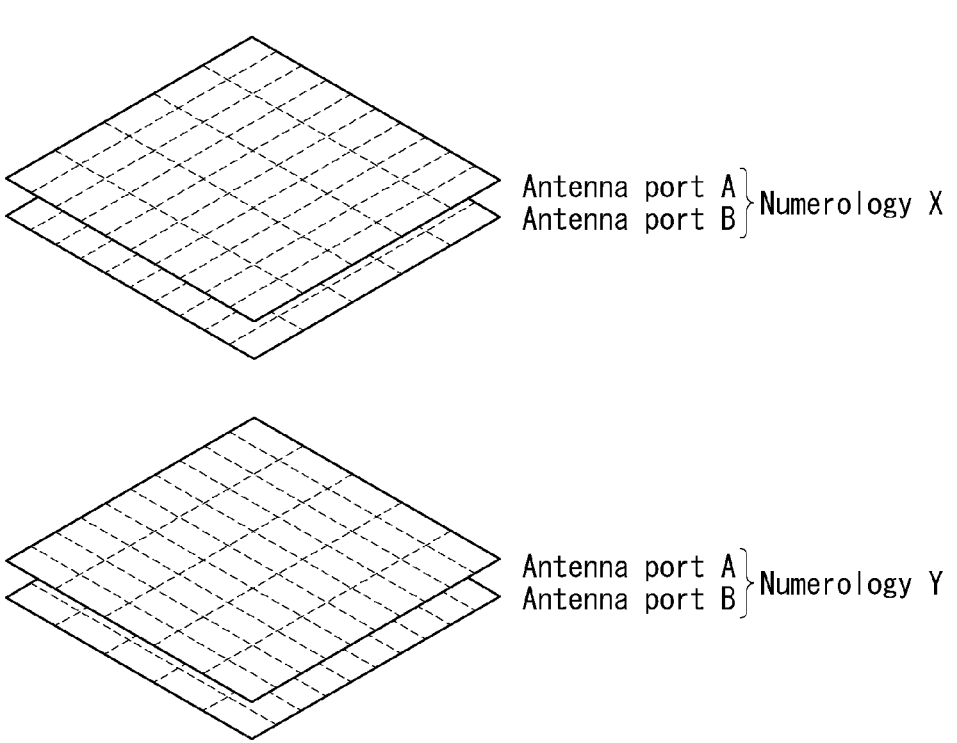

Antenna port A
Antenna port B } Numerology X

Antenna port A
Antenna port B } Numerology Y

【FIG. 7】

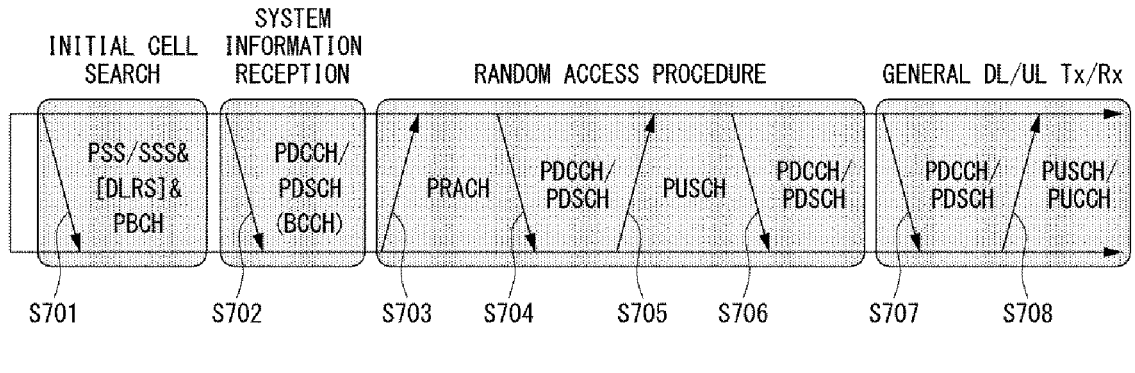

INITIAL CELL SEARCH

SYSTEM INFORMATION RECEPTION

RANDOM ACCESS PROCEDURE

GENERAL DL/UL Tx/Rx

PSS/SSS& [DLRS]& PBCH    PDCCH/ PDSCH (BCCH)    PRACH    PDCCH/ PDSCH    PUSCH    PDCCH/ PDSCH    PDCCH/ PDSCH    PUSCH/ PUCCH

S701    S702    S703    S704    S705    S706    S707    S708

· DL/UL ACK/NACK
· UE CQI/PMI RI REPORT
  USING PUSCH AND PUCCH

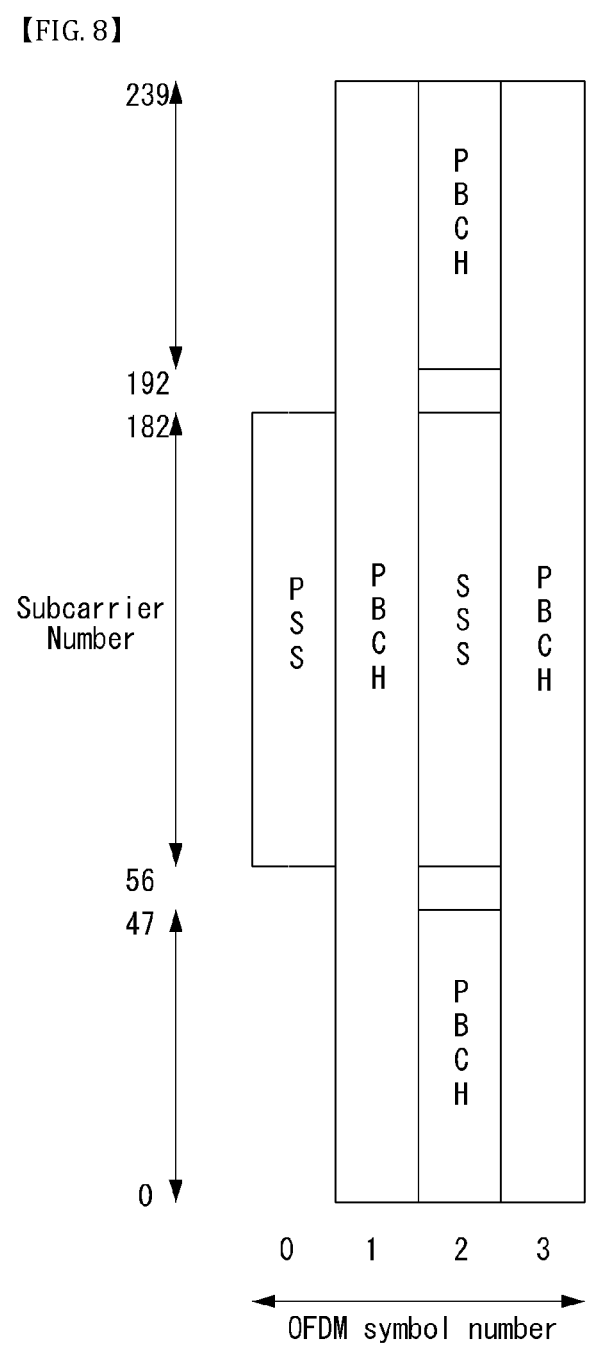

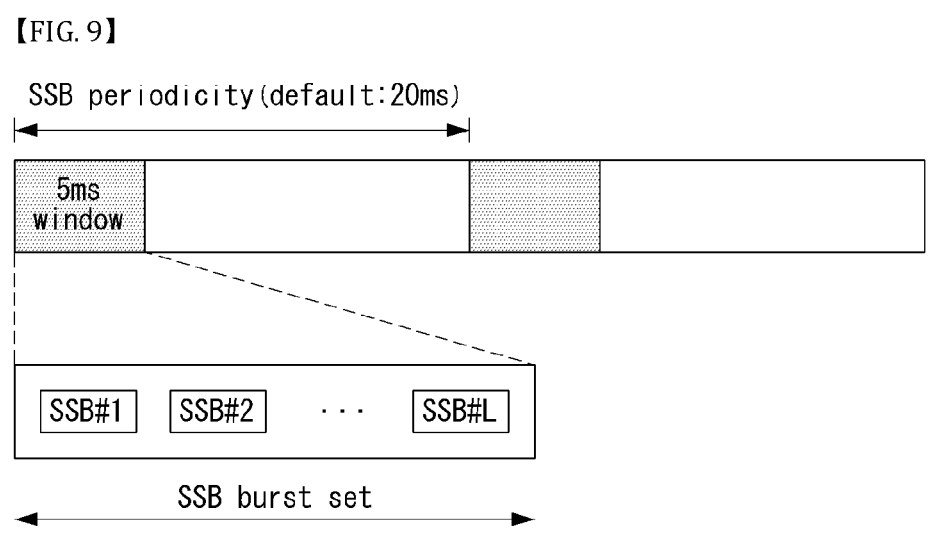

SSB periodicity(default:20ms)

5ms
window

SSB#1    SSB#2    · · ·    SSB#L

SSB burst set

[ FIG. 10 ]
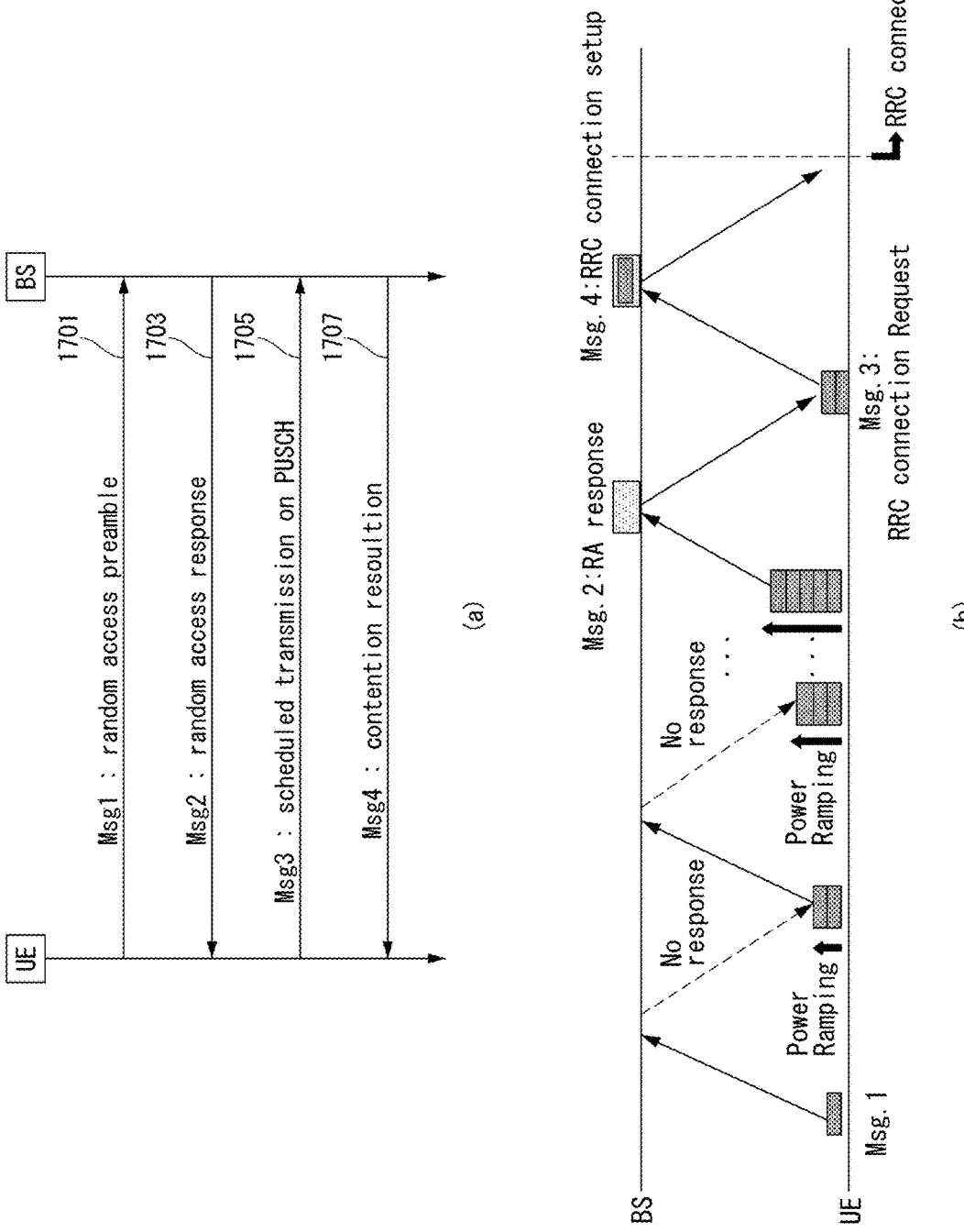
Msg1 : random access preamble
Msg2 : random access response
Msg3 : scheduled transmission on PUSCH
Msg4 : contention resoultion
(a)
Msg. 2:RA response
Msg. 3:
RRC connection Request
Msg. 4:RRC connection setup
RRC connected
No response
Power Ramping
No response
Power Ramping
Msg. 1
(b)

【FIG. 11】
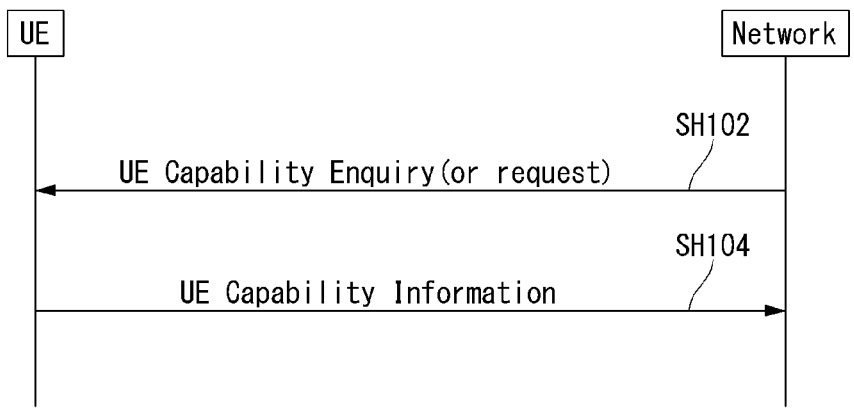
【FIG. 12】
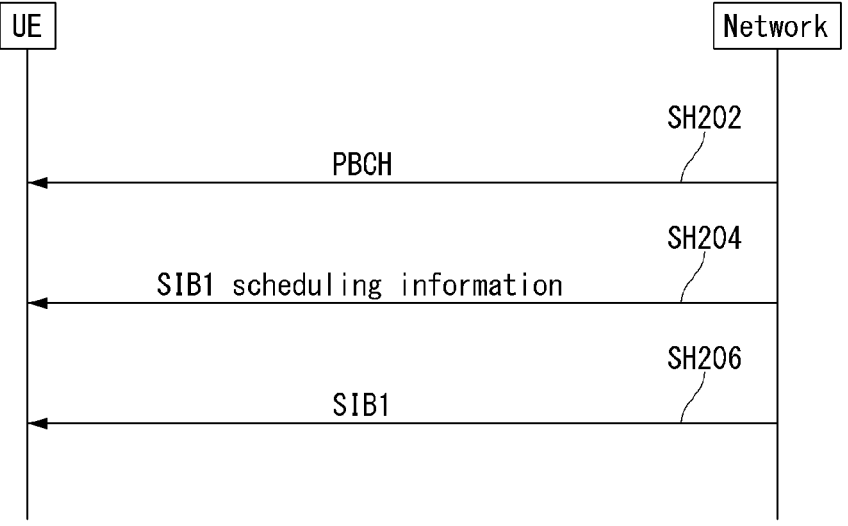

【FIG. 13】
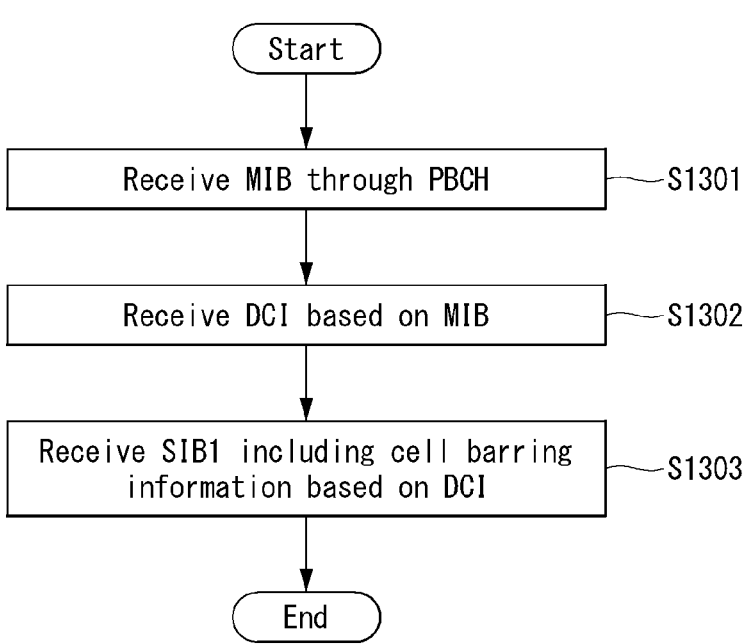
Start
Receive MIB through PBCH ——S1301
Receive DCI based on MIB ——S1302
Receive SIB1 including cell barring information based on DCI ——S1303
End
【FIG. 14】
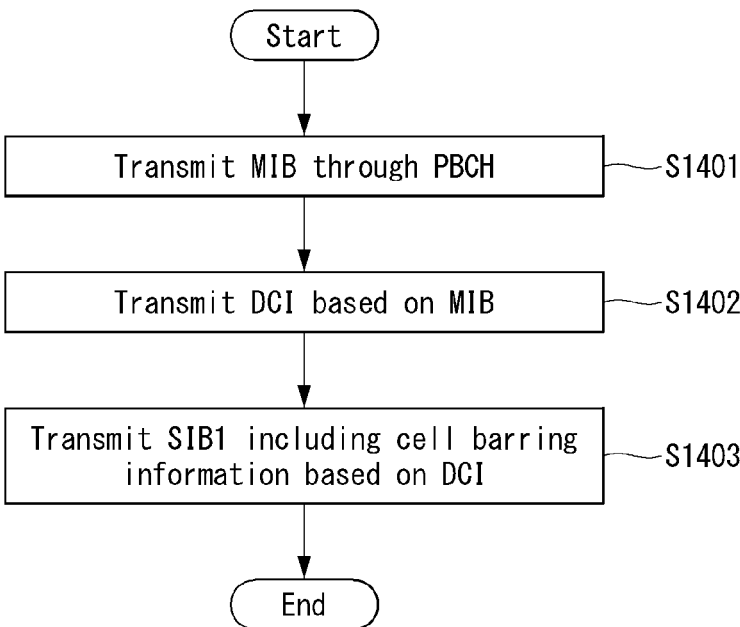
Start
Transmit MIB through PBCH ——S1401
Transmit DCI based on MIB ——S1402
Transmit SIB1 including cell barring information based on DCI ——S1403
End 【FIG. 15】
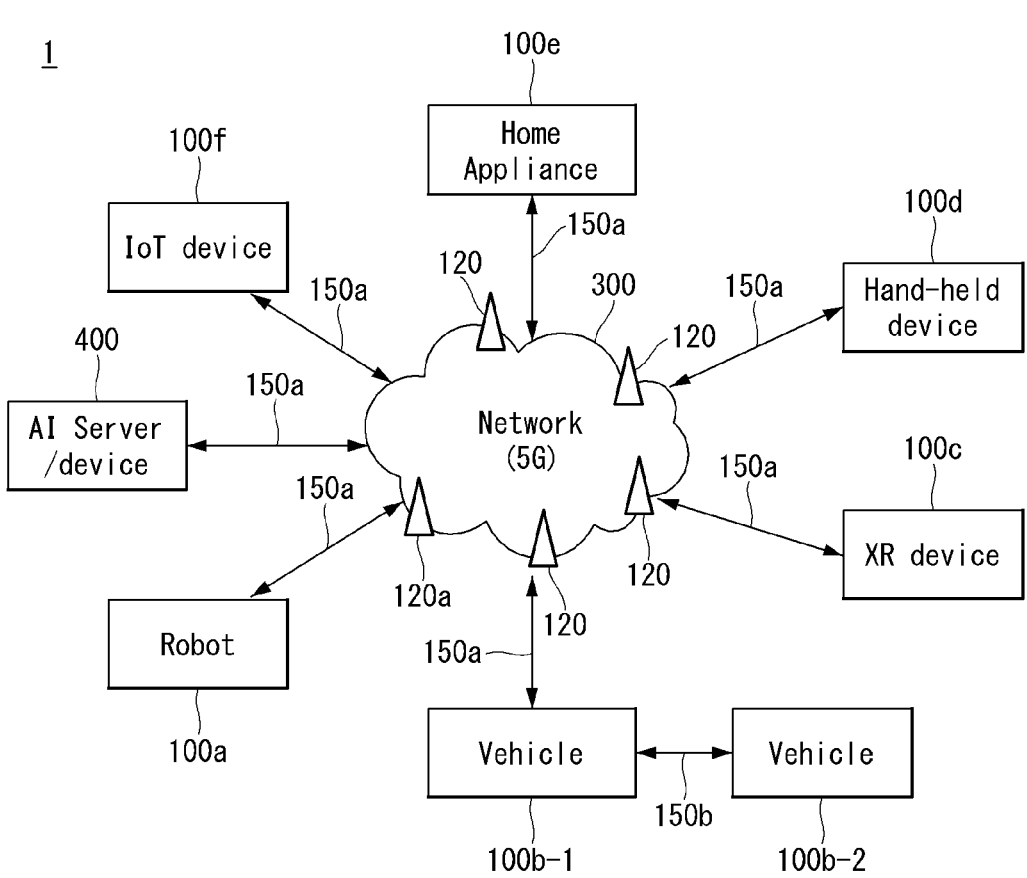

【FIG. 16】
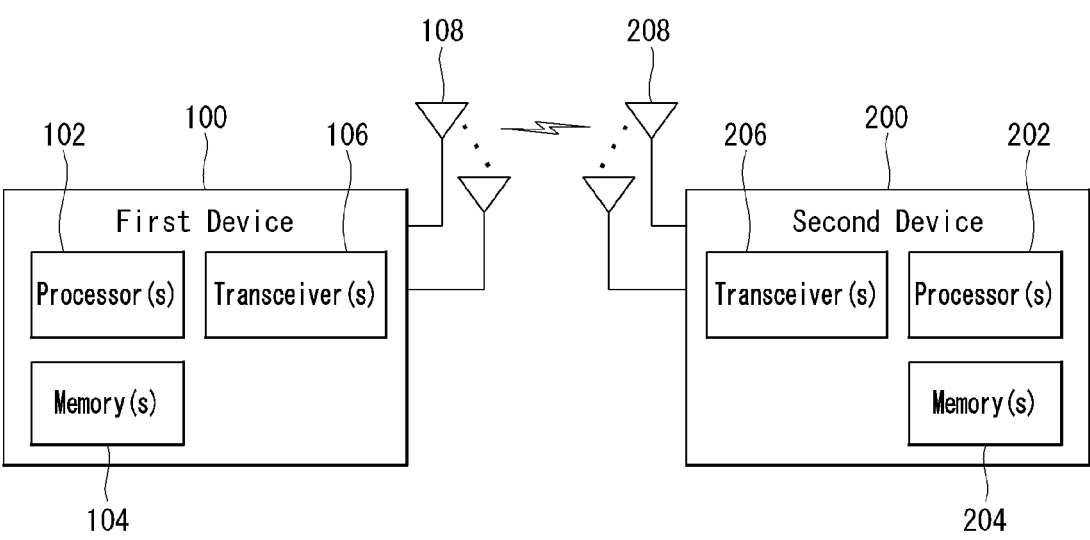
【FIG. 17】
Device(100, 200)
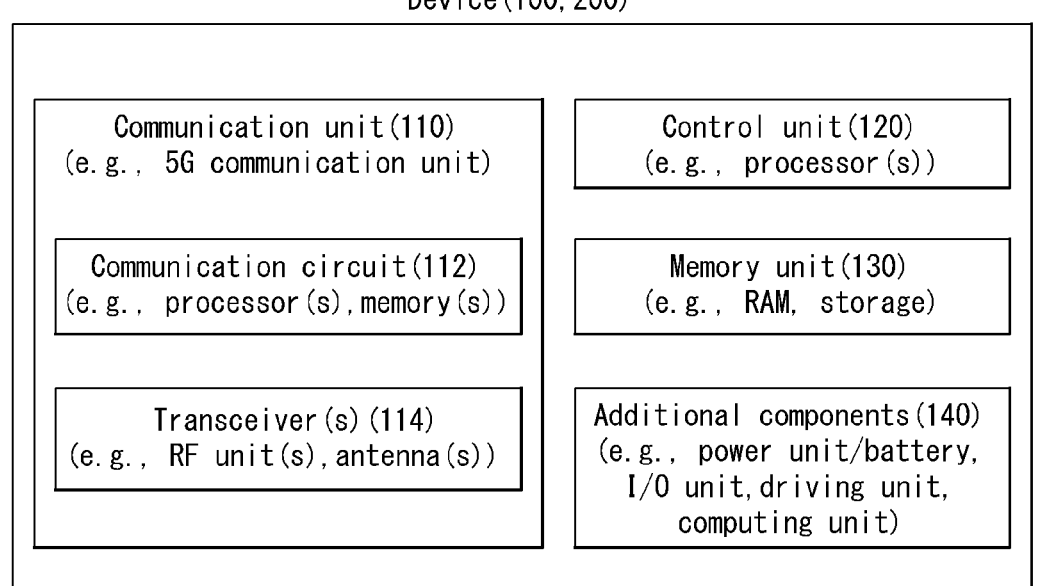

【FIG. 18】
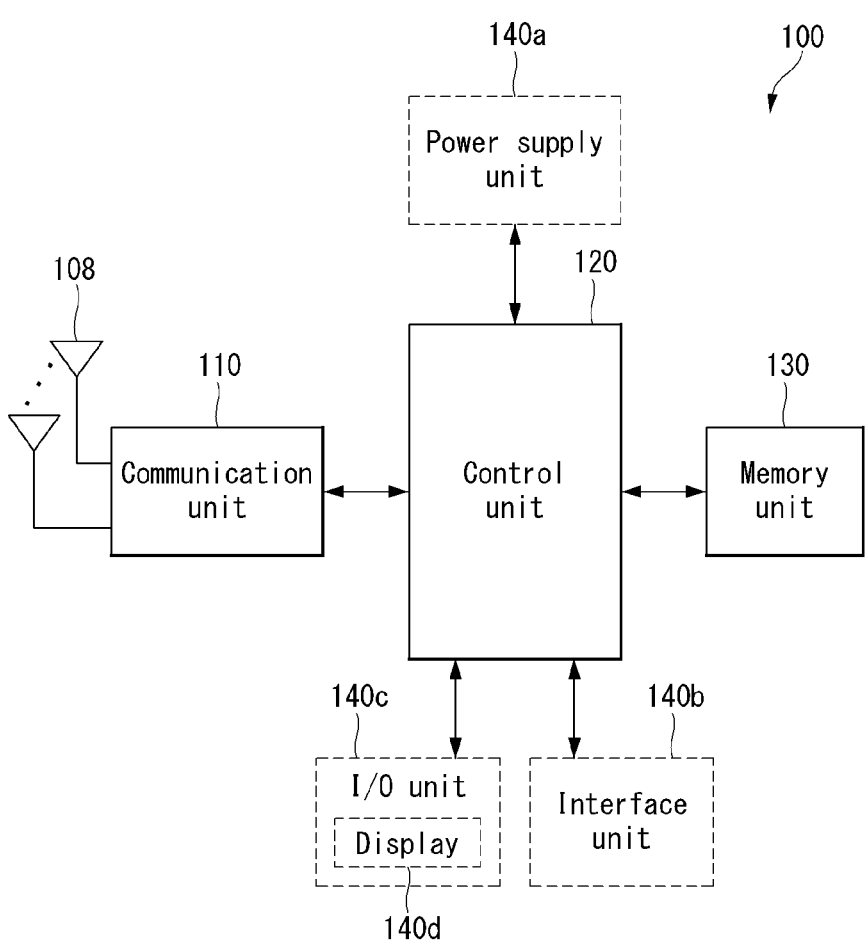

METHOD FOR TRANSMITTING AND RECEIVING SIB1 IN WIRELESS COMMUNICATION SYSTEM, AND DEVICE THEREFOR

CROSS-REFERENCE TO RELATED APPLICATION(S)

This application is the National Stage filing under 35 U.S.C. 371 of International Application No. PCT/KR2022/004883, filed on Apr. 5, 2022, which claims the benefit of earlier filing date and right of priority to Korean Application No. 10-2021-0044824, filed on Apr. 6, 2021, the contents of which are all hereby incorporated by reference herein in their entireties.

TECHNICAL FIELD

The present disclosure relates to a wireless communication system, and more particularly to a method of transmitting and receiving system information block 1 (SIB1) and a device therefor.

BACKGROUND ART

Mobile communication systems have been developed to provide a voice service while ensuring the activity of a user. However, the area of the mobile communication systems has extended to a data service in addition to a voice. Due to the current explosive increase in traffic, there is a shortage of resources, and thus users demand a higher speed service. Accordingly, there is a need for a more advanced mobile communication system.

Requirements for next-generation mobile communication systems need to able to support the accommodation of explosive data traffic, a dramatic increase in data rate per user terminal, the accommodation of a significant increase in the number of connected devices, very low end-to-end latency, and high-energy efficiency. To this end, studies have been conducted on various technologies such as dual connectivity, massive multiple input multiple output (MIMO), in-band full duplex, non-orthogonal multiple access (NOMA), super wideband support, and device networking.

As a reduced capability (RedCap) user equipment (UE) is supported, a problem of loss in terms of spectral efficiency in a specific frequency band is emerging.

DISCLOSURE

Technical Problem

The present disclosure provides a method of transmitting and receiving cell barring information based on a UE type and a device therefor.

The present disclosure provides a method of transmitting and receiving cell barring information in a specific frequency band (or cell) based on the number of receive (Rx) branches of a RedCap UE and a device therefor.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

In one aspect of the present disclosure, there is provided a method of receiving, by a reduced capability (RedCap)

user equipment (UE), a system information block 1 (SIB1) in a wireless communication system, the method comprising receiving a master information block (MIB) from a base station (BS) through a physical broadcast channel (PBCH), receiving downlink control information (DCI) from the BS based on the MIB, and receiving the SIB1 including cell barring information from the BS based on the DCI, wherein the cell barring information represents whether to bar a cell based on a receive (Rx) branch of the RedCap UE, wherein based on the RedCap UE being a UE equipped with one Rx branch, the cell is barred for the RedCap UE, and wherein based on the RedCap UE being a UE equipped with two Rx branches, the cell is not barred for the RedCap UE.

The cell barring information may be 1-bit information.

The cell may be included in a frequency band requiring including four Rx branches.

Based on the cell being barred, a cell search may be performed by changing a frequency.

The MIB may include information related to a control resource set (CORESET) #0.

The DCI may be received on the CORESET #0.

The DCI may be related to DCI format 1_0 with cyclic redundancy check (CRC) scrambled by system information (SI)-radio network temporary identifier (RNTI).

The SIB1 may be received through a physical downlink shared channel (PDSCH).

In another aspect of the present disclosure, there is provided a reduced capability (RedCap) user equipment (UE) configured to receive a system information block 1 (SIB1) in a wireless communication system, the RedCap UE comprising at least one transceiver, at least one processor, and at least one memory operably connected to the at least one processor, wherein the at least one memory is configured to store instructions performing operations based on being executed by the at least one processor, wherein the operations comprise receiving a master information block (MIB) from a base station (BS) through a physical broadcast channel (PBCH), receiving downlink control information (DCI) from the BS based on the MIB, and receiving the SIB1 including cell barring information from the BS based on the DCI, wherein the cell barring information represents whether to bar a cell based on a receive (Rx) branch of the RedCap UE, wherein based on the RedCap UE being a UE equipped with one Rx branch, the cell is barred for the RedCap UE, and wherein based on the RedCap UE being a UE equipped with two Rx branches, the cell is not barred for the RedCap UE.

In another aspect of the present disclosure, there is provided a method of transmitting, by a base station (BS), a system information block 1 (SIB1) in a wireless communication system, the method comprising transmitting a master information block (MIB) to a reduced capability (RedCap) user equipment (UE) through a physical broadcast channel (PBCH), transmitting downlink control information (DCI) to the RedCap UE based on the MIB, and transmitting the SIB1 including cell barring information to the RedCap UE based on the DCI, wherein the cell barring information represents whether to bar a cell based on a receive (Rx) branch of the RedCap UE, wherein based on the RedCap UE being a UE equipped with one Rx branch, the cell is barred for the RedCap UE, and wherein based on the RedCap UE being a UE equipped with two Rx branches, the cell is not barred for the RedCap UE.

The cell barring information may be 1-bit information.

The cell may be included in a frequency band requiring including four Rx branches.

Based on the cell being barred, a cell search may be performed by changing a frequency.

The MIB may include information related to a control resource set (CORESET) #0.

The DCI may be transmitted on the CORESET #0.

The DCI may be related to DCI format 1_0 with cyclic redundancy check (CRC) scrambled by system information (SI)-radio network temporary identifier (RNTI).

The SIB1 may be transmitted through a physical downlink shared channel (PDSCH).

In another aspect of the present disclosure, there is provided a base station (BS) configured to transmit a system information block 1 (SIB1) in a wireless communication system, the BS comprising at least one transceiver, at least one processor, and at least one memory operably connected to the at least one processor, wherein the at least one memory is configured to store instructions performing operations based on being executed by the at least one processor, wherein the operations comprise transmitting a master information block (MIB) to a reduced capability (RedCap) user equipment (UE) through a physical broadcast channel (PBCH), transmitting downlink control information (DCI) to the RedCap UE based on the MIB, and transmitting the SIB1 including cell barring information to the RedCap UE based on the DCI, wherein the cell barring information represents whether to bar a cell based on a receive (Rx) branch of the RedCap UE, wherein based on the RedCap UE being a UE equipped with one Rx branch, the cell is barred for the RedCap UE, and wherein based on the RedCap UE being a UE equipped with two Rx branches, the cell is not barred for the RedCap UE.

In another aspect of the present disclosure, there is provided a processing apparatus configured to control a reduced capability (RedCap) user equipment (UE) to receive a system information block 1 (SIB1) in a wireless communication system, the processing apparatus comprising at least one processor, and at least one memory operably connected to the at least one processor, wherein the at least one memory is configured to store instructions performing operations based on being executed by the at least one processor, wherein the operations comprise receiving a master information block (MIB) from a base station (BS) through a physical broadcast channel (PBCH), receiving downlink control information (DCI) from the BS based on the MIB, and receiving the SIB1 including cell barring information from the BS based on the DCI, wherein the cell barring information represents whether to bar a cell based on a receive (Rx) branch of the RedCap UE, wherein based on the RedCap UE being a UE equipped with one Rx branch, the cell is barred for the RedCap UE, and wherein based on the RedCap UE being a UE equipped with two Rx branches, the cell is not barred for the RedCap UE.

In another aspect of the present disclosure, there is provided a computer readable storage medium storing at least one instruction, wherein the at least one instruction is configured to allow at least one processor to control operations based on being executed by the at least one processor, and wherein the operations comprise receiving a master information block (MIB) from a base station (BS) through a physical broadcast channel (PBCH), receiving downlink control information (DCI) from the BS based on the MIB, and receiving an SIB1 including cell barring information from the BS based on the DCI, wherein the cell barring information represents whether to bar a cell based on a receive (Rx) branch of a reduced capability (RedCap) user equipment (UE), wherein based on the RedCap UE being a UE equipped with one Rx branch, the cell is barred for the RedCap UE, and wherein based on the RedCap UE being a UE equipped with two Rx branches, the cell is not barred for the RedCap UE.

Advantageous Effects

The present disclosure can improve spectral efficiency in a frequency band by transmitting and receiving cell barring information based on a UE type.

The present disclosure can efficiently use a frequency band by transmitting and receiving cell barring information in a specific frequency band (or cell) based on the number of Rx branches of a RedCap UE.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates an example of an overall system structure of NR to which a method described in the present disclosure is applicable.

FIG. 2 illustrates a relationship between an uplink frame and a downlink frame in a wireless communication system to which a method described in the present disclosure is applicable.

FIG. 3 illustrates an example of a frame structure in an NR system.

FIG. 4 illustrates an example of a resource grid supported by a wireless communication system to which a method described in the present disclosure is applicable.

FIG. 5 illustrates a slot structure of an NR frame to which a method described in the present disclosure is applicable.

FIG. 6 illustrates examples of a resource grid per antenna port and numerology to which a method described in the present disclosure is applicable.

FIG. 7 illustrates physical channels and general signal transmission used in a 3GPP system.

FIG. 8 illustrates an SSB structure.

FIG. 9 illustrates SSB transmission.

FIG. 10 illustrates an example of a random access procedure.

FIG. 11 illustrates a flow chart of a procedure of reporting device type information to a base station.

FIG. 12 illustrates a flow chart of a CORESET #0/SS configuration method to which the present disclosure is applicable.

FIG. 13 is a flow chart illustrating an operation method of a RedCap UE described in the present disclosure.

FIG. 14 is a flow chart illustrating an operation method of a base station described in the present disclosure.

FIG. 15 illustrates a communication system (1) applied to the present disclosure.

FIG. 16 illustrates a wireless device applicable to the present disclosure.

FIG. 17 illustrates another example of a wireless device applied to the present disclosure.

FIG. 18 illustrates a portable device applied to the present disclosure.

MODE FOR DISCLOSURE

Reference will now be made in detail to embodiments of the present disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE
    36.211: Physical channels and modulation
    36.212: Multiplexing and channel coding
    36.213: Physical layer procedures
    36.300: Overall description
    36.331: Radio Resource Control (RRC)
3GPP NR
    38.211: Physical channels and modulation
    38.212: Multiplexing and channel coding
    38.213: Physical layer procedures for control
    38.214: Physical layer procedures for data
    38.300: NR and NG-RAN Overall Description
    38.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of megabits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Further, use cases for an area across mMTC and eMBB or mMTC and URLLC are considered important.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system to which a method proposed in the present disclosure may be applied.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

New Rat (NR) Numerology and Frame Structure

In the NR system, multiple numerologies may be supported. The numerologies may be defied by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as two types of frequency ranges (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$ In this case, $\Delta f_{max}=480 \cdot 10^3$, and $N_f=4096$. DL and UL transmission is configured as a radio max frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates the relation between an uplink frame and a downlink frame in a wireless communication system to which a method proposed in the present disclosure may be applied.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $$n_s^\mu \in \left\{ 0, \dots, N_{subframe}^{slots,\mu} - 1 \right\}$$

within a subframe and are numbered in increasing order of $$n_{s,f}^\mu \in \left\{ 0, \dots, N_{frame}^{slots,\mu} - 1 \right\}$$

within a radio frame. One slot consists of consecutive OFDM symbols of $$N_{symb}^\mu,$$

and $$N_{symb}^{\mu}$$

is determined depending on a numerology used and slot configuration. The start of slots $$n_s^{\mu}$$

in a subframe is aligned in time with the start of OFDM symbols $$n_s^{\mu} N_{symb}^{\mu}$$

in the same subframe.

Not all UEs are able to transmit and receive at the same time, and this means that not all OFDM symbols in a downlink slot or an uplink slot are available to be used.

Table 3 represents the number $$N_{symb}^{slot}$$

of OFDM symbols per slot, the number $$N_{slot}^{frame,\mu}$$

of slots per radio frame, and the number $$N_{slot}^{subframe,\mu}$$

of slots per subframe in a normal CP. Table 4 represents the number of OFDM symbols per slot, the number of slots per radio frame, and the number of slots per subframe in an extended CP.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame)

may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In relation to physical resources in the NR system, an antenna port, a resource grid, a resource element, a resource block, a carrier part, etc., may be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 4 illustrates an example of a resource grid supported in a wireless communication system to which a method proposed in the present disclosure may be applied.

Referring to FIG. 4, a resource grid consists of $$N_{RB}^{\mu} N_{sc}^{RB}$$

subcarriers on a frequency domain, each subframe consisting of 14·2μ OFDM symbols, but the present disclosure is not limited thereto.

In the NR system, a transmitted signal is described by one or more resource grids, consisting of $$N_{RB}^{\mu} N_{sc}^{RB}$$

subcarriers, and $$2^{\mu} N_{symb}^{(\mu)}$$

OFDM symbols, where $$N_{RB}^{\mu} \leq N_{RB}^{max,\mu}. \; N_{RB}^{max,\mu}$$

denotes a maximum transmission bandwidth and may change not only between numerologies but also between uplink and downlink.

In this case, as illustrated in FIG. 6, one resource grid may be configured per numerology μ and antenna port p.

FIG. 5 illustrates a slot structure of an NR frame to which a method described in the present disclosure is applicable.

A slot includes a plurality of symbols in a time domain. For example, one slot includes 7 symbols in a normal CP, while one slot includes 6 symbols in an extended CP. A carrier includes a plurality of subcarriers in a frequency domain. A resource block (RB) is defined as a plurality of (e.g., 12) consecutive subcarriers in the frequency domain.

A bandwidth part (BWP) is defined as a plurality of consecutive (P)RBs in the frequency domain and may correspond to one numerology (e.g., SCS, CP length, etc.). The carrier may include up to N (e.g., 5) BWPs. The data communication may be performed through an activated BWP, and only one BWP may be activated in one UE. In a resource grid, each element is referred to as a resource element (RE), and one complex symbol may be mapped to each RE.

FIG. 6 illustrates examples of a resource grid per antenna port and numerology to which a method proposed in the present disclosure is applicable.

Each element of the resource grid for the numerology $\mu$ and the antenna port p is called a resource element and is uniquely identified by an index pair (k,l̄) where $$k = 0, \ldots, N_{RB}^{\mu} N_{sc}^{RB} - 1$$

is an index on a frequency domain, and $$\bar{l} = 0, \ldots, 2^{\mu} N_{symb}^{(\mu)} - 1$$

refers to a location of a symbol in a subframe. The index pair (k,l) is used to refer to a resource element in a slot, where $$l = 0, \ldots, N_{symb}^{\mu} - 1.$$

The resource element (k,l̄) for the numerology $\mu$ and the antenna port p corresponds to a complex value $$a_{k,\bar{l}}^{(p,\mu)}.$$

When there is no risk for confusion or when a specific antenna port or numerology is not specified, the indexes p and $\mu$ may be dropped, and as a result, the complex value may be $$a_{k,\bar{l}}^{(p)} \text{ or } a_{k,\bar{l}}.$$

Further, a physical resource block is defined as $$N_{sc}^{RB} = 12$$

consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration $\mu$.

The center of subcarrier 0 of common resource block 0 for the subcarrier spacing configuration $\mu$ coincides with 'point A'. A common resource block number $$n_{CRB}^{\mu}$$

in the frequency domain and resource elements (k, l) for the subcarrier spacing configuration $\mu$ may be given by the following Equation 1.

$$n_{CRB}^{\mu} = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $$N_{BWP,i}^{size} - 1,$$

where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \qquad \text{[Equation 2]}$$

Here, $$N_{BWP,i}^{start}$$

may be the common resource block where the BWP starts relative to the common resource block 0.

Bandwidth Part (BWP)

The NR system may support up to 400 MHz per component carrier (CC). If a UE operating in wideband CC operates while continuously turning on RF for all CCs, UE battery consumption may increase. Alternatively, when several use cases (e.g., eMBB, URLLC, mMTC, V2X, etc.) operating in one wideband CC are considered, a different numerology (e.g., sub-carrier spacing) may be supported for each frequency band in the corresponding CC. Alternatively, a capability for the maximum bandwidth may vary for each UE. Considering this, the BS may indicate the UE to operate only in some bandwidths not all the bandwidths of the wideband CC, and some bandwidths may be defined as a bandwidth part (BWP) for convenience. The BWP may consist of consecutive resource blocks (RBs) on the frequency axis and may correspond to one numerology (e.g., sub-carrier spacing, CP length, slot/mini-slot duration).

The BS may configure multiple BWPs even in one CC configured to the UE. As one example, a BWP occupying a relatively small frequency domain may be configured in a PDCCH monitoring slot, and a PDSCH indicated in PDCCH may be scheduled onto a BWP larger than this. Alternatively, when UEs are concentrated on a specific BWP, some UEs may be configured to other BWPs for load balancing. Alternatively, considering frequency domain inter-cell interference cancellation between contiguous cells, some middle spectrums among all the bandwidths may be excluded, and BWPs on both sides may be configured even in the same slot. That is, the BS may configure at least one DL/UL BWP to the UE associated with the wideband CC and activate at least one DL/UL BWP (by L1 signaling or MAC CE or RRC signaling, etc.) among configured DL/UL BWP(s) at a specific time, and switching may be indicated to another configured DL/UL BWP (by L1 signaling or MAC CE or RRC signaling, etc.), or when a timer value is expired based on a timer, the timer value may be switched to the fixed DL/UL BWP. In this case, the activated DL/UL BWP is defined as an active DL/UL BWP. However, in a situation in which the UE is in an initial access procedure or before RRC connection is set up, the UE may not receive a configuration for the DL/UL BWP, and in such a situation, the DL/UL BWP assumed by the UE is defined as an initial active DL/UL BWP.

Physical Channel and General Signal Transmission

FIG. 7 illustrates physical channels and general signal transmission used in a 3GPP system. In the wireless communication system, the UE receives information from the base station via downlink (DL) and transmits information to the base station via uplink (UL). The information that the base station and the UE transmit and receive includes data and various control information, and there are various physical channels based on a type/usage of the information that the base station and the UE transmit and receive.

When a UE is powered on or newly enters a cell, the UE performs an initial cell search operation such as synchronizing with a base station in S701. To this end, the UE may receive a primary synchronization signal (PSS) and a secondary synchronization signal (SSS) from the base station to synchronize with the base station and acquire information such as a cell ID. Thereafter, the UE may receive a physical broadcast channel (PBCH) from the base station and acquire in-cell broadcast information. The UE may receive a downlink reference signal (DL RS) in an initial cell search step to check a downlink channel state.

The UE that completes the initial cell search operation may receive a physical downlink control channel (PDCCH) and a physical downlink shared channel (PDSCH) according to information loaded on the PDCCH to acquire more specific system information, in S702.

If the UE first accesses the base station or there is no radio resource for signal transmission, the UE may perform a random access channel (RACH) procedure on the base station in S703 to S706. To this end, the UE may transmit a specific sequence to a preamble via a physical random access channel (PRACH) in S703 and S705, and receive a response message (random access response (RAR) message)

to the preamble via the PDCCH and a corresponding PDSCH. In the case of a contention based RACH, a contention resolution procedure may be additionally performed in S706.

Next, the UE performing the above-described procedure may perform PDCCH/PDSCH reception (S707) and physical uplink shared channel (PUSCH)/physical uplink control channel (PUCCH) transmission (S708) as a general uplink/downlink signal transmission procedure. In particular, the UE may receive downlink control information (DCI) on the PDCCH. Here, the DCI may include control information such as resource allocation information for the UE, and different formats may be applied to the DCI according to the use purpose.

The control information that the UE transmits to the base station via the uplink or receives from the base station may include a downlink/uplink ACK/NACK signal, a channel quality indicator (CQI), a precoding matrix index (PMI), a rank indicator (RI), and the like. The UE may transmit the control information such as the CQI/PMI/RI, etc., on the PUSCH and/or PUCCH.

Initial Access (IA) and Random Access (RA) Procedures

Synchronization Signal Block (SSB) Transmission and Related Operation

FIG. 8 illustrates an SSB structure. The UE may perform cell search, system information acquisition, beam alignment for initial access, DL measurement, and the like based on an SSB. The SSB is interchangeably used with a synchronization signal/physical broadcast channel (SS/PBCH) block.

Referring to FIG. 8, the SSB includes a PSS, an SSS and a PBCH. The SSB consists of four consecutive OFDM symbols, and the PSS, the PBCH, the SSS/PBCH or the PBCH is transmitted per OFDM symbol. Each of the PSS and the SSS consists of one OFDM symbol and 127 subcarriers, and the PBCH consists of 3 OFDM symbols and 576 subcarriers. The PBCH is encoded/decoded based on a polar code and is modulated/demodulated according to quadrature phase shift keying (QPSK). The PBCH in the OFDM symbol includes data resource elements (REs), to which a complex modulation value of the PBCH is mapped, and DMRS REs, to which a demodulation reference signal (DMRS) for the PBCH is mapped. There are three DMRS REs per resource block of the OFDM symbol, and there are three data REs between the DMRS REs.

Cell Search

The cell search refers to a procedure in which a UE acquires time/frequency synchronization of a cell and detects a cell identifier (ID) (e.g., physical layer cell ID (PCI)) of the cell. The PSS is used to detect a cell ID from a cell ID group, and the SSS is used to detect a cell ID group. The PBCH is used to detect an SSB (time) index and a half-frame.

The cell search procedure of the UE may be summarized as shown in Table 5 below.

TABLE 5

| | Type of Signals | Operations |
|---|---|---|
| 1st step | PSS | * SS/PBCH block (SSB) symbol timing acquisition |
| | | * Cell ID detection within a cell ID group |
| | | (3 hypothesis) |
| 2nd Step | SSS | * Cell ID group detection (336 hypothesis) |
| 3rd Step | PBCH DMRS | * SSB index and Half frame (HF) index |
| | | (Slot and frame boundary detection) |

TABLE 5-continued

| | Type of Signals | Operations |
|---|---|---|
| 4th Step | PBCH | * Time information (80 ms, System Frame Number (SFN), SSB index, HF) <br> * Remaining Minimum System Information (RMSI) Control resource set (CORESET)/Search space configuration |
| 5th Step | PDCCH and PDSCH | * Cell access information <br> * RACH configuration |

There are 336 cell ID groups, and there are 3 cell IDs per cell ID group. A total of 1008 cell IDs are present. Information on a cell ID group to which a cell ID of a cell belongs is provided/acquired via the SSS of the cell, and information on the cell ID among 336 cells in the cell ID is provided/acquired via the PSS. FIG. 9 illustrates SSB transmission.

The SSB is periodically transmitted in accordance with SSB periodicity. A default SSB periodicity assumed by a UE during initial cell search is defined as 20 ms. After cell access, the SSB periodicity may be set to one of {5 ms, 10 ms, 20 ms, 40 ms, 80 ms, 160 ms} by a network (e.g., a BS). An SSB burst set is configured at a beginning part of the SSB periodicity. The SSB burst set includes a 5 ms time window (i.e., half-frame), and the SSB may be transmitted up to N times within the SS burst set. The maximum transmission number L of the SSB may be given as follows according to a frequency band of a carrier. One slot includes up to two SSBs.

For frequency range up to 3 GHZ, L=4
For frequency range from 3 GHz to 6 GHz, L=8
For frequency range from 6 GHz to 52.6 GHZ, L=64

A time position of an SSB candidate in the SS burst set may be defined based on a subscriber spacing. The time position of the SSB candidate is indexed from 0 to L−1 (SSB index) in time order within the SSB burst set (i.e., half-frame).

A plurality of SSBs may be transmitted within a frequency span of a carrier. Physical layer cell identifiers of these SSBs need not be unique, and other SSBs may have other physical layer cell identifiers.

The UE may acquire DL synchronization by detecting the SSB. The UE can identify a structure of the SSB burst set based on the detected SSB (time) index, and thus can detect a symbol/slot/half-frame boundary. The number of the frame/half-frame to which the detected SSB belongs may be identified using system frame number (SFN) information and half-frame indication information.

Specifically, the UE may acquire a 10-bit SFN for a frame to which PBCH belongs from the PBCH. Next, the UE may acquire 1-bit half-frame indication information. For example, if the UE detects a PBCH with a half-frame indication bit set to 0, the UE may determine that the SSB, to which the PBCH belongs, belongs to a first half-frame in the frame, and if the UE detects a PBCH with a half-frame indication bit set to 1, the UE may determine that the SSB, to which the PBCH belongs, belongs to a second half-frame in the frame. Finally, the UE may acquire an SSB index of the SSB, to which the PBCH belongs, based on a DMRS sequence and a PBCH payload carried by the PBCH.
System Information Acquisition System information (SI) is divided into a master information block (MIB) and a plurality of system information blocks (SIB). The SI other than the MIB may be referred to as remaining minimum system information (RMSI). The following may be referred to for details.

The MIB includes information/parameters for monitoring PDCCH scheduling PDSCH carrying system information block 1 (SIB1) and is transmitted by a BS via PBCH of SSB. For example, a UE may check whether a control resource set (CORESET) for a Type0-PDCCH common search space exists based on the MIB. The Type0-PDCCH common search space is a kind of PDCCH search space and is used to transmit a PDCCH for scheduling an SI message. If there is a Type0-PDCCH common search space, the UE may determine, based on information (e.g., pdcch-ConfigSIB1)) within the MIB, (i) a plurality of contiguous resource blocks and one or more consecutive symbols constituting the CORESET, and (ii) a PDCCH occasion (e.g., time domain location for PDCCH reception). If there is no Type0-PDCCH common search space, pdcch-ConfigSIB1 provides information for a frequency location where SSB/SIB1 exists and a frequency range where the SSB/SIB1 does not exist.

The SIB1 contains information related to availability and scheduling (e.g., transmission periodicity, SI-window size) of the remaining SIBs (hereinafter, referred to as SIBx, where x is an integer of 2 or more). For example, the SIB1 may inform whether the SIBx is periodically broadcasted or whether the SIBx is provided by a request of the UE according to an on-demand scheme. If the SIBx is provided by the on-demand scheme, the SIB1 may include information which the UE requires to perform an SI request. The SIB1 is transmitted via the PDSCH, the PDCCH for scheduling the SIB1 is transmitted through the Type0-PDCCH common search space, and the SIB1 is transmitted via the PDSCH indicated by the PDCCH.

The SIBx is included in the SI message and is transmitted via the PDSCH. Each SI message is sent within a time window (i.e., SI-window) which periodically occurs.
Channel Measurement and Rate-Matching Up to L SSBs may be transmitted within an SSB burst set, and the number/location of SSBs which are actually transmitted may vary per BS/cell. The number/location of SSBs which are actually transmitted is used for rate-matching and measurement, and information on the actually transmitted SSBs is provided to a UE.
Random Access Procedure A random access procedure of a UE may be summarized as shown in Table 6 and FIG. 10.

TABLE 6

| Type of Signals | Operations/Information obtained |
|---|---|
| 1ˢᵗ step  PRACH preamble in UL | * Initial beam obtainment<br>* Random selection of RA-preamble ID |
| 2ⁿᵈ step  Random Access Response on DL-SCH | * Timing Advanced information<br>* RA-preamble ID<br>* Initial UL grant, Temporary C-RNTI |
| 3ʳᵈ step  UL transmission on UL-SCH | * RRC connection request<br>* UE identifier |
| 4ᵗʰ step  Contention Resolution on DL | * Temporary C-RNTI on PDCCH for initial access<br>* C-RNTI on PDCCH for UE in RRC_CONNECTED |

The random access procedure is used for various purposes. For example, the random access procedure may be used for network initial access, handover, and UE-triggered UL data transmission. The UE may acquire UL synchronization and UL transmission resources through the random access procedure. The random access procedure is classified into a contention-based random access procedure and a contention-free random access procedure.

FIG. 10 illustrates an example of a random access procedure. In particular, FIG. 10 illustrates a contention-based random access procedure.

First, a UE may transmit a random access preamble on a PRACH as Msg1 of a random access procedure in UL (e.g., see 1701 in (a) of FIG. 10).

Random access preamble sequences having different two lengths are supported. Long sequence length 839 is applied to subcarrier spacings of 1.25 kHz and 5 kHz, and short sequence length 139 is applied to subcarrier spacings of 15 kHz, 30 kHz, 60 kHz and 120 KHz.

Multiple preamble formats are defined by one or more RACH OFDM symbols and different cyclic prefixes (and/or guard time). RACH configuration for a cell is included in system information of the cell and is provided to the UE. The RACH configuration includes information on a subcarrier spacing of PRACH, available preambles, preamble format, and the like. The RACH configuration includes association information between SSBs and RACH (time-frequency) resources. The UE transmits a random access preamble in the RACH time-frequency resource associated with the detected or selected SSB.

A threshold of the SSB for the RACH resource association may be set by the network, and an RACH preamble is transmitted or retransmitted based on the SSB in which reference signal received power (RSRP) measured based on the SSB satisfies the threshold. For example, the UE may select one of the SSB(s) satisfying the threshold and may transmit or retransmit the RACH preamble based on the RACH resource associated with the selected SSB.

When a BS receives the random access preamble from the UE, the BS transmits a random access response (RAR) message (Msg2) to the UE (e.g., see 1703 in (a) of FIG. 10). A PDCCH that schedules a PDSCH carrying a RAR is CRC masked with a random access (RA) radio network temporary identifier (RNTI) (RA-RNTI) and is transmitted. The UE that detects the PDCCH masked with the RA-RNTI may receive a RAR from the PDSCH scheduled by DCI carried by the PDCCH. The UE checks whether the RAR includes random access response information for the preamble transmitted by the UE, i.e., Msg1. Presence or absence of random access information for the Msg1 transmitted by the UE may be determined based on presence or absence of a random access preamble ID for the preamble transmitted by the UE.

If there is no response to the Msg1, the UE may retransmit the RACH preamble less than a predetermined number of times while performing power ramping, as illustrated in (b) of FIG. 10. The UE calculates PRACH transmission power for preamble retransmission based on most recent pathloss and a power ramping counter.

The random access response information includes timing advance information for UL synchronization, an UL grant, and UE temporary cell RNTI (C-RNTI). If a temporary UE receives random access response information for the UE itself on the PDSCH, the UE can know timing advance information for UL synchronization, an initial UL grant, and UE temporary cell RNTI (C-RNTI). The timing advance information is used to control uplink signal transmission timing. In order to ensure that the PUSCH/PUCCH transmission by the UE is better aligned with subframe timing at a network end, the network (e.g. BS) may measure a time difference between the PUSCH/PUCCH/SRS reception and subframes and send timing advance information based on the time difference. The UE may perform UL transmission as Msg3 of the random access procedure on a physical uplink shared channel based on the random access response information (e.g., see 1705 in (a) of FIG. 10). The Msg3 may include an RRC connection request and a UE identifier. The network may transmit Msg4 as a response to the Msg3, and the Msg4 may be handled as a contention resolution message on DL (e.g., see 1707 in (a) of FIG. 10). The UE may enter an RRC connected state by receiving the Msg4.

The contention-free random access procedure may be used or performed when the UE handovers to another cell or the BS or when the contention-free random access procedure is requested by a command of the BS. A basic process of the contention-free random access procedure is similar to the contention-based random access procedure. However, unlike the contention-based random access procedure in which the UE randomly selects a preamble to be used among a plurality of random access preambles, in the contention-free random access procedure, a preamble (hereinafter, referred to as a dedicated random access preamble) to be used by the UE is allocated by the BS to the UE. Information on the dedicated random access preamble may be included in an RRC message (e.g., a handover command) or may be provided to the UE via a PDCCH order. When the random access procedure is initiated, the UE transmits the dedicated random access preamble to the BS. When the UE receives the random access procedure from the BS, the random access procedure is completed.

As mentioned above, the UL grant in the RAR schedules PUSCH transmission to the UE. The PUSCH carrying initial UL transmission based on the UL grant in the RAR is also referred to as Msg3 PUSCH. The content of the RAR UL grant starts at an MSB and ends at a LSB, and is given in Table 7.

TABLE 7

| RAR UL grant field | Number of bits |
|---|---|
| Frequency hopping flag | 1 |
| Msg3 PUSCH frequency resource allocation | 12 |
| Msg PUSCH time resource allocation | 4 |
| Modulation and coding scheme (MCS) | 4 |
| Transmit power control (TPC) for MSg3 PUSCH | 3 |
| CSI request | 1 |

A TPC command is used to determine transmission power of the Msg3 PUSCH and is interpreted, for example, based on Table 8.

TABLE 8

| TPC command | Value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

In the contention-free random access procedure, a CSI request field in the RAR UL grant indicates whether the UE includes an aperiodic CSI report in the corresponding PUSCH transmission. A subcarrier spacing for the Msg3 PUSCH transmission is provided by an RRC parameter. The UE will transmit the PRACH and Msg3 PUSCH on the same uplink carrier of the same service serving cell. A UL BWP for Msg3 PUSCH transmission is indicated by SIB1 (SystemInformationBlock1).

Technical Terms Used in the Present Disclosure
  UE: User Equipment
  SSB: Synchronization Signal Block
  MIB: Master Information Block
  RMSI: Remaining Minimum System Information
  FR1: Frequency domain with frequency range less than or equal to 1.6 GHZ (e.g., 450 MHz to 6,000 MHz)
  FR2: Millimeter wave (mmWave) domain with frequency range greater than or equal to 2.24 GHz (e.g., 24,250 MHz to 52,600 MHz)
  BW: Bandwidth
  BWP: Bandwidth Part
  RNTI: Radio Network Temporary Identifier
  CRC: Cyclic Redundancy Check
  SIB: System Information Block
  SIB1: SIB1 for NR devices=RMSI (Remaining Minimum System Information). It broadcasts information, etc. necessary for cell access of an NR UE.
  CORESET (Control Resource SET): time/frequency resource in which an NR UE tries candidate PDCCH decoding
  CORESET #0: CORESET for Type0-PDCCH CSS set for NR devices (configured at MIB)
  Type0-PDCCH CSS set: a search space set in which an NR UE monitors a set of PDCCH candidates for a DCI format with CRC scrambled by a SI-RNTI
  MO: PDCCH Monitoring Occasion for Type0-PDCCH CSS set SIB1-R: (additional) SIB1 for reduced capability NR devices. It may be limited when it is generated with a separate TB from SIB1 and is transmitted on a separate PDSCH.
  CORESET #0-R: CORESET #0 for reduced capability NR devices
  Type0-PDCCH-R CSS set: a search space set in which a RedCap UE monitors a set of PDCCH candidates for a DCI format with CRC scrambled by a SI-RNTI
  MO-R: PDCCH Monitoring Occasion for Type0-PDCCH CSS set
  Cell defining SSB (CD-SSB): SSB including RMSI scheduling information among NR SSBs
  Non-cell defining SSB (non-CD-SSB): SSB that has been deployed on NR sync raster, but does not include RMSI scheduling information of a corresponding cell for measurement. But, the SSB may include information informing a location of cell defining SSB.
  SCS: subcarrier spacing
  SI-RNTI: System Information Radio-Network Temporary Identifier
  Camp on: "Camp on" is a UE state in which the UE stays on a cell and is ready to initiate a potential dedicated service or to receive an ongoing broadcast service.
  TB: Transport Block
  RSA (RedCap standalone): Redcap device or cell supporting only service In addition to 5G main use cases (mMTC, eMBB and URLLC), the importance/interest in the use case domain over mMTC and eMBB or mMTC and URLLC has recently increased. Hence, the need for UEs for efficiently supporting these use cases in terms of device cost, power consumption, form factor, etc. has increased.

In the present disclosure, a UE for the above purpose is called a (NR) reduced capability UE/device, or a (NR) RedCap UE/device for short. Further, distinguished from the RedCap device, a general NR UE that supports all or one or more of the 5G main use cases is called an NR (normal) UE/device. The NR UE may be a UE that satisfies all of 5G key capabilities (peak data rate, user experienced data rate, latency, mobility, connection density, energy efficiency, spectrum efficiency, and area traffic efficiency) defined in IMT-2020. The RedCap UE may be a UE that intentionally reduces some capabilities in order to achieve device cost, power consumption, and small form factor.

The 5G use case domain over mMTC and eMBB or mMTC and URLLC that are target use cases of the RedCap device is called RedCap use cases for convenience of explanation in the present disclosure.

For example, the RedCap use cases may be as follows.
[RedCap Use Cases]
Connected Industries
  Sensors and actuators are connected to 5G networks and core
  Include massive Industrial Wireless Sensor Network (IWSN) use cases and requirements
  Not only URLLC services with very high requirements, but also relatively low-end services with the requirement of small device form factors with a battery life of several years
  Requirements for these services are higher than Low Power Wide Area (LPWA) (i.e., LTE-M/NB-IoT) but lower than URLCC and eMBB.
  Devices in such environment include e.g., pressure sensors, humidity sensors, thermometers, motion sensors, accelerometers, actuators, etc.

Smart City

The smart city vertical covers data collection and processing to more efficiently monitor and control city resources, and to provide services to city residents.

Especially, the deployment of surveillance cameras is an essential part of the smart city but also of factories and industries.

Wearables

Wearables use case includes smart watches, rings, eHealth related devices, and medical monitoring devices.

One characteristic for the use case is that the device is small in size.

The RedCap use cases cannot be supported by low power wireless area (LPWA) UEs (e.g., LTE-M, NB-IoT, etc.) in terms of bit rate, latency, etc. The NR UE can functionally support the RedCap use cases, but the support may be ineffective in terms of the UE manufacturing cost, form factor, battery life, etc.

The fact that a RedCap UE having characteristics such as low cost, low power, small form factor, etc. supports the use case area in the 5G network can bring an effect of reducing the manufacturing cost and maintenance cost of the UEs.

The RedCap use cases have quite diverse requirements in terms of UE complexity, target bit rate, latency, power consumption, etc., and requirements that the RedCap UE shall satisfy in the present disclosure is referred to as RedCap requirements. The RedCap requirements may be divided into generic requirements commonly applied to all the RedCap use cases and use case specific requirements applied only to some use case(s).

As an example of some typical RedCap use cases, the generic requirements and the use case specific requirements may be summarized as follows.

[RedCap Requirements]

Generic Requirements

Device complexity/cost: Main motivation for the new device type is to lower the device cost and complexity as compared to high-end eMBB and URLLC devices of Rel-15/Rel-16. This is especially the case for industrial sensors.

Device size: Requirement for most use cases is that the standard enables a device design with compact form factor Deployment scenarios: System should support all FR1/FR2 bands for FDD and TDD Use Case Specific Requirements Industrial Wireless Sensors reference bit rate: <2 Mbps (potentially UL heavy traffic)

end-to-end latency: <100 ms; ~5-10 ms for safety related sensors battery: at least few years communication service availability: 99.99% stationary

Video Surveillance

Reference bit rate: <2-4 Mbps for economic video; ~7.5-25 Mbps for high-end video (UL heavy traffic)

Latency: <500 ms

Reliability: 99%-99.9%

Wearables

Reference bit rate: 10-50 Mbps in DL and >=5 Mbps in UL for smart wearable application Peak bit rate: 150 Mbps in DL and 50 Mbps in UL Battery: multiple days (up to 1-2 weeks)

An example of schematic use case specific requirements for the three typical RedCap use cases is the same as Table 9.

TABLE 9

| Use cases | Complexity | Form factor | Bit rate (Mbps) | Latency (ms) | Mobility | Battery |
|---|---|---|---|---|---|---|
| Industrial Wireless Sensor | Very low | Very small | A few | Tens of/ A few [1] | Stationary | Years |
| Video Surveillance | Low [2] | Small | A few/ Tens of | Hundreds of | Stationary | |
| Wearables | Low [2] | Small | Tens of | | Mobile | Weeks |

[1] safety related sensors
[2] Low complexity compared to the normal NR device

The RedCap requirements can be satisfied by (combination of) various features provided by the UE and the BS. The followings are examples of features and sub-features supported by the UE/BS for satisfying the RedCap requirements.

[RedCap UE Features]

Complexity Reduction Features

Reduced number of UE RX/TX antennas

UE Bandwidth reduction

Half-Duplex-FDD

Relaxed UE processing time

Relaxed UE processing capability

Power Saving

Reduced PDCCH monitoring by smaller numbers of BDs and CCE limits

Extended DRX for RRC Inactive and/or Idle

RRM relaxation for stationary devices

Coverage recovery/enhancement

The RedCap use cases may define and support one or multiple UEs. The present disclosure considers all the following two cases (Case A/Case B).

Case A: Support the RedCap use cases in a single device type case

Case B: Support the RedCap use cases in multiple device type case

In the Case A, a RedCap UE may be a UE satisfying all the RedCap requirements (i.e., the generic requirements and the use case specific requirements), and/or may be a UE supporting all the RedCap use cases. In this case, because the UE shall simultaneously satisfy various requirements, there may be a factor increasing the cost due to an increase in the UE complexity, but at the same time, a cost reduction effect can be expected from mass production based on the expansion of use cases.

In the Case B, considering that the RedCap use case requirements are considerably diverse, a device type may be defined and supported for each RedCap use case. Even in this case, all the generic requirements may be commonly satisfied. In this instance, respective device types defined for each use case are referred to as RedCap device types. The Case B includes a case where several use cases that are similar in terms of requirements are grouped and supported in a single device type. These RedCap device types may be to support some or a specific combination previously defined among RedCap UE features. As above, when multiple RedCap device types are defined and support RedCap use cases, there is an advantage that specific RedCap use case(s) can be supported through a RedCap UE that is more optimized in terms of cost, power consumption, etc. For example, an IWS use case may be supported through a dedicated UE that is very small, inexpensive, and power efficient.

In the present disclosure, reduced capability may include the meaning of reduced/low complexity/low cost/reduced bandwidth, and the like.

Redcap Device Type Classification and Method of Reporting to BS

For the case where RedCap use cases are supported by multiple device types (i.e., Case B), the following methods may be considered to classify the RedCap device type (or RedCap UE type). The following methods can be applied even to the Case A in order to distinguish the RedCap device from the NR UE.

In order to support an operation of the RedCap device distinguished from the NR UE, the RedCap device may have to report device type information of the RedCap device to the base station. FIG. 11 illustrates a flow chart of a procedure of reporting device type information to a base station. The reporting procedure may reuse a UE capability transfer procedure defined in a predefined standard (e.g., 3GPP TS 38.331), as follows. The base station may acquire RedCap device type information through UE capability information reception and may use UE information acquired upon the scheduling of the corresponding UE.

For example, the base station/network may request UE capability from the UE in RRC_CONNECTED state (SH102). And/or, the UE may transmit the RedCap device type information to UE capability information (SH104).

[Classification Method 1]

Redcap device types may be classified based on one of main requirements. Examples of the main requirements that can be the basis of classification may include supported max data rate (peak bit rate), latency, mobility (stationary/fixed, portable, mobile, etc.), battery lifetime, complexity, coverage, and the like. (Combination of) UE feature(s) that shall be mandatorily supported or can be selectively supported for each classified RedCap device type may be defined in a predefined standard (e.g., 3GPP Specification). This may be to reduce overhead separately signaling whether to support features for each device type. In the present disclosure, 'defined in a predefined standard' may mean that it is predefined/pre-configured/pre-promised between the UE and the base station.

Redcap device type information that is included in UE capability information and is reported by the UE to the base station/network may be, for example, a specific field of UE-NR-Capability information element (IE) (e.g., RedCap-DeviceType). For example, when the RedCap device types are classified into RedCap device type 1, 2, . . . , a value of RedCapDeviceType field may be expressed by an integer value such as 1, 2, . . . , or a combination of character and integer such as r1, r2, . . . . As above, the UE has an advantage of signaling overhead by including the device type and parameters related to it in capability information as one field and reporting it.

For example, the RedCap device types may be classified based on a supported max data rate, and the UE may report the RedCap device type to the base station based on this classification.

The supported max data rate of the NR UE may be defined/determined as the following Equation in a predefined standard (e.g., 3GPP TS 38.306).

Supported Max Data Rate

General

The DL and UL max data rate supported by the UE may be calculated by bands or band combinations supported by the UE. A UE supporting NR (e.g., NR SA, MR-DC) may need to support the calculated DL and UL max data rate defined in the following.

Supported Max Data Rate

For NR, the approximate data rate for a given number of aggregated carriers in a band or band combination may be computed by the following Equation 3.

$$datarate(\text{in } Mbps) = \qquad\qquad \text{[Equation 3]}$$

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot \left(1 - OH^{(j)}\right) \right)$$

Where J is the number of aggregated component carriers in a band or band combination.

$$R_{max} = 948/1024$$

For the j-th CC, $$v_{Layers}^{(j)}$$

is the maximum number of supported layers given by higher layer parameter maxNumberMIMO-LayersPDSCH for downlink or higher layer parameters maxNumberMIMO-LayersCB-PUSCH and maxNumberMIMO-LayersNonCB-PUSCH for uplink.

$$Q_m^{(j)}$$

is the maximum supported modulation order given by higher layer parameter supportedModulationOrderDL for downlink and higher layer parameter supportedModulationOrderUL for uplink.

$f^{(j)}$ is the scaling factor given by higher layer parameter scalingFactor and can take the values 1, 0.8, 0.75, and 0.4.

$\mu$ is the numerology.

$$T_s^{\mu}$$

is the average OFDM symbol duration in a subframe for numerology $\mu$, i.e., $$T_s^{\mu} = 10^{-3}/14 \cdot 2^{\mu}.$$

Normal cyclic prefix is assumed.

$$N_{PRB}^{BW(j),\mu}$$

is the maximum RB allocation in bandwidth $BW^{(j)}$ with numerology $\mu$, where $BW^{(j)}$ is the UE supported maximum bandwidth in the given band or band combination.

$OH^{(j)}$ is the overhead and takes the following values.

0.14, for frequency range FR1 for DL 0.18, for frequency range FR2 for DL 0.08, for frequency range FR1 for UL 0.10, for frequency range FR2 for UL Only one of the UL or SUL carriers is counted for a cell operating SUL.

The approximate maximum data rate can be computed as the maximum of the approximate data rates computed using the above Equation for each of the supported band or band combinations.

For single carrier NR SA operation, the UE shall support a data rate for the carrier that is no smaller than the data rate computed using the above Equation, with, J=1 CC and component $$v_{Layers}^{(i)} \cdot Q_m^{(j)} \cdot f_{1-}^{(j)}$$

is no smaller than 4.

For example, the value 4 in the component above can correspond to $$v_{Layers}^{(j)} = 1, Q_m^{(j)} = 4 \text{ and } f^{(j)} = 1.$$

For EUTRA in case of MR-DC, the approximate data rate for a given number of aggregated carriers in a band or band combination can be computed by the following Equation 4.

$$\text{Data rate (in } Mbps) = 10^{-3} \cdot \sum_{j=1}^{J} TBS_j \qquad \text{[Equation 4]}$$

Where J is the number of aggregated EUTRA component carriers in MR-DC band combination.

$TBS_j$ is the total maximum number of DL-SCH transport block bits received or the total maximum number of UL-SCH transport block bits transmitted, within a 1 ms TTI for j-th CC, as derived from a predefined standard (e.g., 3GPP TS36.213) based on the UE supported maximum MIMO layers for the j-th CC, and based on the maximum modulation order for the j-th CC and number of PRBs based on the bandwidth of the j-th CC according to indicated UE capabilities.

The approximate maximum data rate can be computed as the maximum of the approximate data rates computed using Equation 4 above for each of the supported band or band combinations.

For MR-DC, the approximate maximum data rate can be computed as the sum of the approximate maximum data rates from NR and EUTRA.

In this case, parameters required for the formula computing the supported max data rate that the NR UE shall support may be reported by the UE by a request of the base station in RRC_CONNECTED state. The parameters are as follows. The higher elements mean higher RRC information elements (IE) to which the parameters belong.

FeatureSetDownlink scalingFactor

FeatureSetDownlinkPerCC maxNumberMIMO-LayersPDSCH supported Modulation OrderDL supported BandwidthDL supportedSubCarrierSpacingDL FeatureSetUplink scalingFactor FeatureSetUplinkPerCC maxNumberMIMO-LayersCB-PUSCH maxNumberMIMO-LayersNonCB-PUSCH supportedModulationOrderUL supported BandwidthUL supportedSubCarrierSpacingUL For the RedCap UE, in a method of classifying the RedCap device types based on the supported max data rate, values of the parameters for each device type are defined in a predefined standard (e.g., 3GPP Specification), and the UE may indicate the RedCap device type information and information on the parameters to the base station by setting a value of RedCapDeviceType field of UE-NR-Capability IE to a specific value. Compared to the related operation that the NR UE includes the parameters in UE capability information and transmits it to the base station, the RedCap UE can expect an effect of signaling overhead reduction by reporting the device type and the parameters related to it through one field. The base station can acquire the device type, the supported max data rate, and the values of the parameters mentioned above through value of RedCapDeviceType field and use them in UE scheduling, etc.

[Classification Method 2]

Alternatively, RedCap device types may be classified based on (combination of) UR feature(s) that shall be mandatorily supported or can be selectively supported, not based on main requirements. This may be a more appropriate method when features that shall be supported or can be supported for each use case are clear.

(Combination of) UR feature(s) that is predefined for each RedCap device type in a predefined standard (e.g., 3GPP Specification) may be referred to as a feature set. A feature set that shall be mandatorily supported for each device type among (combination of) the UR feature(s) may be referred to as a mandatory feature set of the corresponding device type or specifying the device type.

In this method, definition of the RedCap device type may not be specified in the predefined standard (e.g., 3GPP Specification), and this may mean that the RedCap use cases are supported in separate device types supporting different feature sets.

In the above method, a RedCap UE may report a RedCap device type or use case(s) supported by the RedCap UE to a base station by reporting a predefined feature set to the base station. This can be seen as a method that more closely conforms to the basic philosophy of NR to support various use cases through various optional features without distinguishing a separate UE category. The feature set may be replaced by a combination of capability parameters (i.e., capability parameter set). The feature set may be a mandatory feature set defined in the predefined standard (e.g., 3GPP Specification) per RedCap device type.

For the above operation, a set of candidate features (i.e., feature pool) for RedCap device (type) may be defined or configured in the predefined standard (e.g., 3GPP Specification), and the RedCap device may report a mandatory feature set defined for each type based on a type of the RedCap device to the base station. The UE may additionally report an optional feature set in addition to the mandatory feature set to the base station. The UE may perform an additional operation or a more optimized operation for a specific use case by additionally selecting and reporting the optional feature set. For example, for a device type for a surveillance camera use case, when a wired power supply UE and a battery power supply UE coexist, the mandatory feature set does not include a power saving feature and may designate or include the optional feature. Hence, the UE may report the feature to the base station when selectively supporting the feature based on the detailed device type.

The base station may grasp whether to support the feature based on whether the corresponding parameter is present in the feature set reported by the RedCap UE, and reflect it upon the scheduling of the corresponding UE.

[Classification Method 3]

Alternatively, RedCap device types may be classified based on a combination of capability parameter(s). The combination of capability parameters classifying the Red-Cap device types may parameters determining the RedCap requirements. Examples of the capability parameters determining the RedCap device type may include UE supported bandwidth, modulation order, and number of MIMO layers determining a supported max data rate requirement supported by the UE. Values of the parameters may be a list of actually supportable values, or a maximum value among supported values.

For example, capability parameter(s) determining the RedCap device type may be as follows.

Supported Bandwidth (NRB): (max) UE channel bandwidth or (max) UE transmission bandwidth; in units of RB Supported modulation order (Qm): Qm=2 for QPSK; 4 for 16 QAM; 6 for 64 QAM; etc.

Supported number of MIMO layers (NL): replaceable with number of antennas (Na)

A combination of capability parameters determining the RedCap device type may be referred to as a capability parameter set of the corresponding device type. For example, the RedCap device type may be defined by classifying capability parameter set value(s) in ascending order (or descending order) of the supported max data rate. The following example is an example of defining M device types in ascending order of the supported max data rate.

Classification (example) of Redcap device types based on capability parameter set value(s):

Device Type 1: {NL, NRB, Qm}={1, 25, 2}

Device Type 2: {NL, NRB, Qm}={1, 25, 4}, or {1, 52, 2}

Device Type 3: {NL, NRB, Qm}={1, 52, 4}, or {1, 106, 2}

Device Type 4: {NL, NRB, Qm}={1, 106, 4}, or {2, 106, 2}

Device Type 5: {NL, NRB, Qm}={1, 106, 6}

Device Type 6: {NL, NRB, Qm}={2, 106, 4}

Device Type 7: {NL, NRB, Qm}={2, 106, 6}

. . .

Device Type M: {NL, NRB, Qm}={X, Y, Z}

For example, for NR frequency range 1 (FR1) (i.e., band of 6 GHz or less), NRB value may use one value among values defined in Table 10 (the number of configurable maximum RBs per UE channel bandwidth). The above example is value based on subcarrier spacing (SCS)=15 kHz. If the RedCap device supports SCS=30 kHz, and a cell that the RedCap device wants to access uses SCS=30 kHz for data transmission, the NRB value based on SCS=15 kHz in the above example may be replaced by a value corresponding to SCS=30 kHz with reference to Table 10.

Table 10 shows max transmission bandwidth configuration NRB per subcarrier spacing (SCS) at NR FR1.

TABLE 10

| SCS (kHz) | 5 MHz $N_{RB}$ | 10 MHz $N_{RB}$ | 15 MHz $N_{RB}$ | 20 MHz $N_{RB}$ |
|---|---|---|---|---|
| 15 | 25 | 52 | 79 | 106 |
| 30 | 11 | 24 | 38 | 51 |

In the device type classification example, the device Type 2/3/4 is a case of defining one device type using multiple capability set values. As above, when the device types are classified based on the supported max data rate, multiple capability parameter set values defining one device type may mean combinations supporting the same or similar supported max data rate.

Supportable device type(s) for each use case using the device type(s) defined in the above example may be defined as follows. Based on the supportable device type(s), the base station may restrict the cell access, or perform subscription based barring.

Supportable device type(s) (example) for each use case

IWS: Device types 1, 2

Video Surveillance: Device types 2, 3

Wearables: Device type: Device types 4, 5, 6, 7

In order to avoid an increase in cost due to market segmentation according to an excessive division of the device type, the number M of device types may be limited. For example, when M=1, the RedCap UE is not classified into the multiple device types, and can support all the target use cases in a single device type.

As another example, when M=3, device type classification and supportable device type(s) for each use case may be defined as follows.

Device type classification based on capability set value(s) (e.g., when M=3):

Device Type 1: {NL, NRB, Qm}={1, 25, 2} (or {1, 25, 4} or {1, 52, 2})

Device Type 2: {NL, NRB, Qm}={1, 52, 4} or {1, 106, 2}

Device Type 3: {NL, NRB, Qm}={2, 106, 6}

Supportable device type(s) for each use case (e.g., when M=3)

IWS: Device types 1

Video Surveillance: Device types 3

Wearables: Device type: Device types 7

A UE max bandwidth (i.e., bandwidth capability of the RedCap UE) may be determined as a minimum bandwidth satisfying a bit rate required in a target use case. A UE max bandwidth reduction can reduce RF element and/or baseband processing cost and expect an effect of reducing power consumption. Herein, the required bit rate may mean a peak rate or the supported max data rate considering that the device manufacturing cost is determined by the peak rate or the supported max data rate not an average bit rate and a reference bit rate.

When determining the max bandwidth supporting the required bit rate, a specific value may be assumed for other parameters (e.g., number of antennas (NL), modulation order (Qm), etc.) determining the required bit rate. For example, in the above example, for Device Type 3, a peak rate of about ~28 MHz may be supported. In this instance, the required max bandwidth may be 20 MHZ (106 RBs) when {NL=1, Qm=2} is assumed, and 10 MHz (52 RBs) when {NL=1, Qm=4} is assumed. Or, the required max bandwidth may be 5 MHz (25 RBs) when {NL=2, Qm=4} is assumed.

Device Type 3: {NL, NRB, Qm}={1, 52, 4} or {1, 106, 2}

Within the max UE bandwidth of the RedCap UE, a transmission bandwidth may be assigned and transmitted/received by network configuration using RRC signaling, etc.

A UE min bandwidth may be defined as a minimum value among NR UE channel bandwidths (or transmission bandwidths) greater than or equal or an NR SSB bandwidth.

For example, at FR1, the UE min bandwidth may be 5 MHz for NR SSB with SCS=15 kHz, and may be 10 MHz for NR SSB with SCS=30 kHz.

As another example, at FR2, the UE min bandwidth may be 40 MHz for NR SSB with SCS=120 kHz, and may be 80 MHz for NR SSB with SCS=240 KHz.

This may be to implement low power consumption and at the same time support an access on an NR cell via NR SSB by supporting a service, in which the required bit rate is small, at a minimum bandwidth.

[Classification Method 4]

Considering that a bandwidth capability of a RedCap UE is determined by a required bit rate of respective use cases, a RedCap device type may be classified based on a UE bandwidth capability. For example, a bandwidth capability determining the RedCap device type may be to represent a (max) UE channel bandwidth or a (max) UE transmission bandwidth (i.e., supported bandwidth (NRB)) in units of RB. Alternatively, the bandwidth capability may be a minimum UE channel bandwidth or a minimum UE transmission bandwidth. More specifically, the following classification is possible.

Classification method 4-1) The RedCap device type is classified by a max bandwidth and is used by being configured with an actual data transmission/reception bandwidth (<=max bandwidth)

Classification method 4-2) The RedCap device type is classified by a min bandwidth and is used by being configured with an actual data transmission/reception bandwidth (>=min bandwidth)

Classification method 4-3) One or multiple supportable bandwidths (set) are defined for each device type, and is used by being configured with an actual data transmission/reception bandwidth within the corresponding bandwidth (set)

For the classification methods 4-1/2/3, the max bandwidth may be limited to a value (e.g., 20 MHz) less than an NR bandwidth, and the min bandwidth may be greater than or equal to an SSB bandwidth (e.g., 5 MHz for 15 kHz SSB).

Below, the present disclosure describes a method of configuring CORESET #0/SS configuration for cell access of a RedCap UE (hereinafter, first embodiment), a method of controlling a cell access of a RedCap UE (hereinafter, second embodiment), a method of indicating system information for controlling cell access of a RedCap UE (hereinafter, third embodiment), and an operation method of a RedCap UE in an RSA scenario (hereinafter, fourth embodiment).

Embodiments described below in the present disclosure are merely distinguished for convenience of explanation. Thus, it is obvious that partial method and/or partial configuration of any embodiment can be substituted or combined with partial method and/or partial configuration of another embodiment.

The contents described above (3GPP system, frame structure, NR system, etc.) can be combined with methods proposed in the present disclosure to be described below, and/or supplemented to clarify technical features of the methods described in the present disclosure.

In the present disclosure, '( )' can be interpreted as both when excluding content in ( ) and when including content in parentheses.

In the present disclosure, '/' can be interpreted as when including all the contents separated by '/' (and), or when including only a part of the separated contents (or).

First Embodiment

The present embodiment describes a method of configuring CORESET #0/SS configuration for cell access of a RedCap UE.

The present embodiment describes a method of configuring CORESET #0 and Type0-PDCCH common search space (CSS) set for receiving (additional) cell access information for the RedCap UE, in order to support NR cell access of the RedCap UE defined by the above method.

FIG. 12 illustrates a flow chart of a CORESET #0/SS (search space) configuration method to which the present disclosure is applicable.

Referring to FIG. 12, a base station (BS) may transmit a physical broadcast channel (PBCH) to a UE, and the UE may receive the PBCH from the base station (SH202). According to a proposal method of the present disclosure, CORESET #0 (and/or CORESET #0-R) related information and/or MO (and/or MO-R) related information may be configured and transmitted/received via the PBCH.

And/or, the base station may transmit SIB1 scheduling information to the UE through the CORESET #0, and the UE may receive the SIB1 scheduling information from the base station through the CORESET #0 (SH204). The SIB1 scheduling information may be configured and transmitted/received based on the proposal method of the present disclosure.

And/or, the base station may transmit SIB1 to the UE based on the SIB1 scheduling information, and the UE may receive the SIB1 from the base station based on the SIB1 scheduling information (SH206). The SIB1 may include NR SIB1 (or conventional SIB1) and/or SIB1-R based on the proposal method of the present disclosure.

The CORESET #0/SS configuration method described in the present disclosure may be applied to the PBCH transmission/reception process (SH202), and/or the SIB1 scheduling information transmission/reception process (SH204), and/or the SIB1 transmission/reception process (SH206).

Methods described below are merely distinguished for convenience of explanation. Thus, it is obvious that configuration of any method can be substituted or combined with configuration of another method.

(Method 1-1)—Transmission of Cell Access Information for the RedCap UE Through CORESET #0

(Additional) cell access information for the RedCap UE may be additionally transmitted using a conventional SIB1 transmission PDSCH. This method may be a method of generating SIB1 and the (additional) cell access information for the RedCap UE as one transport block (TB) and transmitting it through the SIB1 transmission PDSCH.

In this instance, the SIB1 scheduling information may be transmitted through the same process as the conventional NR. That is, CORESET #0 may be configured for the SIB1 scheduling information transmission, and CORESET #0 information may be transmitted via the PBCH.

This method may be limited to be applied within a range where a payload size does not exceed an SIB1 payload size limit (e.g., 2976 bits) defined in the NR after adding the cell access information of the RedCap UE. If it exceeds, or if an amount of the cell access information added for the RedCap UE from a system perspective is significant although it does not exceed, the (additional) cell access information of the RedCap UE may be generated as a separate TB, and a separate PDSCH may be transmitted.

The (additional) cell access information of the RedCap UE transmitted as the separate TB/PDSCH may be referred to as SIB1-R. In this instance, the RedCap UE may need to (sequentially) receive both the SIB and the SIB1-R for the purpose of cell access. As an example of the sequential reception, a suitability check for camp-on determines by reading the SIB1, and pagecelling monitoring and initial access may be performed by acquiring additional RACH-config and paging information through the SIB1-R after the camp-on.

(Method 1-1-1)—Transmission of SIB1-R Through Separate PDSCH and Scheduling of SIB1-R Via SIB1 Scheduling DCI (Single DCI Scheme)

For the above reasons, when the base station configures SIB1 and SIB1-R as a separate TB and transmits them through a separate PDSCH, SIB1-R scheduling information may be transmitted via the same DCI as DCI transmitting SIB1 scheduling information. That is, both PDSCH transmitting SIB1 via single DCI and SIB1-R transmission PDSCH(s) TDMed (time division multiplexing) or FDMed (frequency division multiplexing) with the PDSCH can be scheduled. In this instance, as in the related art, SIB1 scheduling DCI may schedule SIB1 transmission PDSCH, and SIB1-R transmission PDSCH may be transmitted to have a time offset or a frequency offset from the SIB1 transmission PDSCH In this instance, a value of the time offset or the frequency offset may be a preset value or may be transmitted through specific field/bits (e.g., reserved field/bits) of the SIB1 scheduling DCI (without a need of signaling). Alternatively, the SIB1-R scheduling information may be transmitted through specific field/bits (e.g., reserved field/bits) of the SIB1 scheduling DCI. A method of transmitting the SIB1 and the SIB1-R scheduling information via the single DCI may enable UE power saving and latency reduction by reducing DCI reception burden. The single DCI may be DCI format 1_0, with CRC scrambled by SI-RNTI, which is transmitted through CORESET #0.

(Method 1-1-2)—Transmission of SIB1-R Through Separate PDSCH and Scheduling of SIB1-R Using Separate DCI in CORESET #0

This method is a method of transmitting SIB1-R through a separate PDSCH distinguished from SIB1 and transmitting SIB1-R scheduling DCI through CORESET #0 by distinguishing from SIB1 scheduling DCI. A DCI size different from DCI format 1_0 with CRC scrambled by conventional SI-RNTI may be used to distinguish DCI, or DCI may be distinguished through RNTI when the same DCI size shall be used for a reason of blind decoding (BD) capability, etc. of the RedCap UE.

For the distinguishment with SI-RNTI for system information (SI) reception, separate RNTI (e.g., SI-R (reduced)-RNTI) may be defined and granted to receive system information of the RedCap UE.

Alternatively, when the same DCI size and the sane RNTI (SI-RNTI) shall be used due to a lack of RNTI, DCI may be distinguished through unused states of a DCI field (e.g., unused state of an MCS field). In addition, DCI may be distinguished by modifying (e.g., flipping) 8-bit distributed CRC for early termination. In this case, if a distributed CRC modification (e.g., flipping) is applied in DCI format 1_0 with CRC scrambled by SI-RNTI, an increase of BD can be prevented when the same method shall be applied to other RNTIs for the same DCI format.

(Method 1-2)—Transmission of Cell Access Information for the RedCap UE Through CORESET #0-R (i.e., RedCap UE Dedicated CORESET #0)

The above method is a method of configuring separate CORESET #0 for the RedCap UE and transmitting SIB1-R scheduling information via DCI transmitted through the corresponding CORESET. This method may be required if NR CORESET #0 cannot be limited to a RedCap bandwidth, i.e., if CORESET #0 bandwidth>RedCap bandwidth. Alternatively, application may be limited to the above case. For example, the above case may include when the CORESET #0 bandwidth cannot be set to be less than or equal to the RedCap bandwidth due to a capacity problem of a UE (including RedCap) in the corresponding NR cell or a problem of not being able to sufficiently secure a control channel element aggregation level (CCE AL) of a control channel, or when 5 MHz NR-Light UE intends to be supported in FR1 30 kHz SSB frequency band.

(Method 1-2-1)—Method of Determining Locations of CORESET #0-R and MO-R

The base station may indicate to receive (part of) cell access information as part of PBCH payload through SIB1-R. In this instance, CORESET #0-R configuration information and/or MO-R information for SIB1-R reception may be additionally transmitted. Alternatively, the CORESET #0-R configuration information and/or MO-R information for SIB1-R reception may mean to receive (part of) the cell access information through SIB1-R. In this instance, if there is no CORESET #0-R configuration information and/or MO-R information for SIB1-R reception in the PBCH, the UE may assume that there is no SIB1-R information in the corresponding cell, or assume that the RedCap UE is not supported.

(MO-R location) With respect to the CORESET #0-R configuration information and/or MO-R information for SIB1-R reception, the RedCap UE may determine a starting point (e.g., starting slot) of MO-R as a relative location (e.g., slot or symbol offset) from (starting or last slot of) SSB or (starting or last slot of) MO. In this instance, the MO location may be indicated in the PBCH in the same manner as the conventional method, and relative location information (e.g., slot/symbol offset) of MO-R may be defined in a predefined standard (e.g., 3GPP Specification) or may be transmitted to a part of a PBCH payload. The part of the PBCH payload may be unused/reserved bit(s) among bit(s) generated in L1 or spare bit(s) of MIB generated in higher layer. For example, the bit(s) generated in L1 may be a value signaled through an initialization value of a DMRS sequence used for PBCH reception.

(Location of CORESET #0-R) With a similar approach to the location determination of MO-R, a location of CORESET #0-R may be determined as a relative location from CORESET #0, and time/frequency offset information determining the relative location may be defined in a predefined standard (e.g., 3GPP Specification) or may be transmitted to a part of a PBCH payload. For example, only a part of CORESET #0 may be configured as CORESET #0-R so that the CORESET #0-R bandwidth is adjusted to be less than or equal to a max bandwidth of the RedCap UE. In this instance, a method is also possible in which the reduced number of RBs compared to CORESET #0 (i.e., how much to reduce CORESET #0 bandwidth to determine the bandwidth of CORESET #0-R from a RedCap UE perspective) is notified via the PBCH in the form of an offset. This method may be a method of defining the number of puncturing RBs in the predefined standard (e.g., 3GPP Specification) or transmitting it via PBCH signaling, if the CORESET #0 bandwidth is set to be greater than the max bandwidth of the RedCap UE, when the CORESET #0-R is configured so that the CORESET #0-R bandwidth is less than or equal to the max bandwidth of the RedCap UE by puncturing some highest or lowest RB(s) in the CORESET #0 bandwidth.

Examples of a method of determining locations of the CORESET #0-R and the MO-R may be as follows.

Example E1) CORESET #0-R configuration information and/or MO-R information may be transmitted using a part of the PBCH payload. For FR1, if a total of 4 or 3 bits (2 spare bits in MIB, 2 or 1 unused/reserved bit(s) in PBCH DMRS sequence) are available, limited configuration (e.g., in form of a table) is possible using 4 or 3 bits (or less). And/or, relative location information of MO-R and CORESET #0-R may be transmitted using the above method. And/or, information indicating whether to support RedCap of the corresponding cell and joint encoding may be performed.

Example E2) Whether to support RedCap or the presence or absence of SIB1-R may be indicated to a part of the PBCH payload, and configuration (e.g., time/frequency location) of CORESET #0-R and/or MO-R may be determined by a predefined rule. And/or, {SSB/CORESET #0-NL multiplexing pattern, bandwidth, number of symbols, RB offset} may be defined in a predefined standard (e.g., 3GPP Specification). And/or, the relative location information of MO-R and CORESET #0-R may be defined in a predefined standard (e.g., 3GPP Specification).

Example E3) Whether to support RedCap or the presence or absence of SIB1-R may be indicated to a part of the PBCH payload, and CORESET #0-R configuration information and/or MO-R information may be transmitted via a separate signal/channel (i.e., 2-step signaling). A message transmitted via a separate signal/channel may be referred to as MIB-R for convenience.

MIB-R may be transmitted via a separate signal/channel from the PBCH on which the existing MIB is transmitted. In this instance, scheduling information of the MIB-R may be transmitted to (a part of) the PBCH payload (in a method similar to the example E1), or may be determined by a predefined rule (in a method similar to the example E2).

With respect to the above examples, some parameter(s) (e.g., slot offset, RB offset, etc.) among CORESET #0-R configuration information and/or MO-R information for SIB1-R reception can be configured, and information on the parameter(s) can be transmitted using a part of the PBCH payload. In this instance, other part except for some parameters notified via the PBCH may be a type defined in a predefined standard (e.g., 3GPP Specification).

When the above methods/examples are applied, a procedure of acquiring SIB1-R through CORESET #0-R/MO-R from a RedCap UE perspective may be as follows.

PBCH payload (including MIB)==>SIB-R type (in the examples E1 and E2) or, PBCH payload (including MIB)==>MIB-R==>SIB-R type (in the example E3).

(Method 1-2-2)-Method of Determining Whether the UE Uses CORESET #0-R/MO-R (Implicit Indication)

The CORESET #0-R may be activated only when the CORESET #0 bandwidth is outside a bandwidth range supported by the RedCap UE. The face that the CORESET #0-R is activated may mean that the RedCap UE shall receive the cell access information through the CORESET #0-R. The bandwidth supported by the RedCap UE may be determined by the min bandwidth and the max bandwidth.

That is, in a cell supporting the RedCap UE, the RedCap UE may receive SIB1(-R) through CORESET #0 if the CORESET #0 bandwidth is less than or equal to the RedCap max bandwidth and is greater than or equal to the RedCap min bandwidth, and may receive SIB1-R through CORESET #0-R if the CORESET #0 bandwidth is greater than the RedCap max bandwidth or is less than the RedCap min bandwidth. Accordingly, if the min bandwidth and/or the max bandwidth per the RedCap UE type vary, the bandwidth supported by the RedCap UE type may vary.

Since whether to activate the CORESET #0-R per the RedCap UE type may vary, the form of CORESET #0 for acquiring the cell access information per the RedCap UE type may vary. That is, specific RedCap UE type(s) may acquire the cell access information through SIB1(-R) reception through CORESET #0, and other RedCap UE type(s) may acquire the cell access information through SIB1-R reception through CORESET #0-R. An example of application per the RedCap UE type in this method may be as follows.

For example, in the classification method 4-1), if the CORESET #0 bandwidth set by the base station is greater than the max bandwidth of the RedCap UE (type), CORESET #0-R may be activated. And/or, in the classification method 4-2), if the CORESET #0 bandwidth set by the base station is less than the min bandwidth of the RedCap UE (type), CORESET #0-R may be activated. And/or, in the classification method 4-3), the base station may set the CORESET #0 bandwidth to one (e.g., max value) of the bandwidth values commonly supported by the RedCap UEs (e.g., maximum value), and the UE may activate CORESET #0-R if the CORESET #0 bandwidth is not included in (a range of) the bandwidth value(s) supported by the UE.

In the above example, the case where the base station cannot limit the CORESET #0 bandwidth to less than or equal to a specific value may be the case where the base station cannot limit the CORESET #0 bandwidth to less than or equal to the specific value due to a capacity problem of the UE (including RedCap) in the corresponding NR cell or a problem of not being able to sufficiently secure a CCE AL of a control channel.

(Method 1-2-3)—Method for Signaling Overhead Reduction

Since the PBCH transmission payload is quite limited and future proofing shall also be considered, it may be preferable to refrain from using reserved/spare field/bits as much as possible. In such a case, a method of reducing a signaling overhead may be considered by limiting the CORESET #0(-R) bandwidth in relation to the RedCap (max or min) bandwidth and/or the SSB bandwidth. This may mean that only CORESET #0 having a bandwidth, that is less than or equal to the max bandwidth of the RedCap UE (type) among the CORESET #0 bandwidths supported in the corresponding cell, is supported. Therefore, if separate CORESET #0 configuration for the RedCap UE (type) is required, the effect of reducing signaling bits can be expected as the number or combination of supported CORESET #0 is reduced.

For example, CORESET #0(-R) bandwidth may be limited by the RedCap max bandwidth. For example, only ($N_{C,M}$) CORESET #0(-R)(s) having the largest bandwidth among CORESET #0(-R)(s) having a bandwidth less than (or less than or equal to) the RedCap max bandwidth may be supported and may be signaled in one of the above methods within the supported CORESET #0(-R)(s).

And/or, the CORESET #0(-R) bandwidth may be limited by the SSB bandwidth ($N_{C,S}$ CORESET #0(-R) bandwidths per SSB can be selected).

And/or, only ($N_{C,M}$) CORESET #0(-R)(s) having the smallest bandwidth among CORESET #0(-R)(s) having a bandwidth greater than (or greater than or equal to) the SSB bandwidth may be supported and may be signaled in one of the above methods within the supported CORESET #0(-R)(s). For example, if $N_{C,S}$=1, only 24 PRBs CORESET #0(-R) may be supported in 15 kHz SSB, and only 48 PRBs CORESET #0(-R) may be supported in 30 kHz SSB.

(Method 1-3)—Transmission of PDCCH-Less SIB1-R

When physical downlink control channel (PDCCH) repetition is required for coverage recovery/enhancement of the RedCap UE, SIB1-R may be transmitted through the PDSCH without PDCCH, i.e., without CORESET #0-R configuration for the purpose of RedCap UE power saving and/or latency reduction. Further, this method may be applied when configuration of CORESET #0(-R) having a bandwidth less than or equal to the RedCap UE max bandwidth is not easy or when SIB1-R shall be transmitted through a separate PDSCH for the reasons mentioned above. In this instance, scheduling information of SIB1-R transmission PDSCH may be transmitted to a part of the PBCH payload or may be determined by a predefined rule. For example, the scheduling information of the SIB1-R transmission PDSCH may be transmitted in the method of the examples E1/E2/E3. Alternatively, in a state in which a plurality of candidate scheduling parameter sets are defined in a predefined standard (e.g., 3GPP Specification), it may be selected and indicated in the form of an index in the PBCH.

A procedure of acquiring the cell access information from a RedCap UE perspective upon PDCCH-less SIB1-R transmission may be as follows.

PBCH payload (including MIB)==>SIB1-R transmission PDSCH form (in the examples E1 and E2) or, PBCH payload (including MIB)==>MIB-R==>SIB1-R transmission PDSCH form (in the example E3).

Second Embodiment

The present embodiment describes a method of controlling a cell access of a RedCap UE.

It may be helpful to control the UE access at the earliest possible step for power saving, cell access time reduction, etc. of the RedCap UE. If the RedCap UE is subdivided based on a type and is supported to efficiently support various use cases, additional benefits can be expected by controlling the cell access per the RedCap UE type. The present embodiment describes methods of transmitting cell access control information (e.g., barring information) per the RedCap UE or the RedCap UE type for this purpose. In the present disclosure, the 'RedCap UE' may be referred to as a 'RedCap device'.

Methods described below are merely distinguished for convenience of explanation. Thus, it is obvious that configuration of any method can be substituted or combined with configuration of another method.

(Method 2-1)—Transmission of Cell Access Information in PBCH Transmission Step

The method 2-1 is a method of transmitting cell access information of the RedCap UE (type) to a PBCH payload (e.g., SH202 of FIG. 12). This method has the greatest benefit in terms of power saving and cell access time reduction by transmitting cell access control information at the earliest possible step.

(Explicit indication method) the method of transmitting cell access information of the RedCap UE (type) (e.g., cell barring information per the RedCap UE or UE type) to the PBCH payload may consider methods such as the following examples.

For example, the cell access information of the RedCap UE (type) may be transmitted using a part of the PBCH payload. For FR1, if a total of 4 or 3 bits (2 spare bits in MIB, 2 or 1 unused/reserved bit(s) in PBCH DMRS sequence) are available, the cell access information of the RedCap UE (type) may be transmitted using 4 or 3 bits (or less) in the form of bit map or joint encoding.

For another example, for UE barring in the conventional NR in a RedCap standalone (RSA) scenario, barring information (CellBarred, intraFreqReselection) that has been transmitted to the part of the PBCH payload may be reused as RedCap UE (type) barring information.

(Implicit indication method) the cell access information of the RedCap UE (type) may be transmitted through CORESET #0 scheduling information transmitted to the PBCH payload. In this instance, if CORESET #0(-R) bandwidth is not within a supported range based on a bandwidth supported by the RedCap UE (type), the RedCap UE may be considered barred from the corresponding cell.

The explicit indication method and/or the implicit indication method may be used simultaneously or in combination. For example, when both the explicit indication method and the implicit indication method are applied, if either of the two methods is 'barred', the RedCap UE (type) may be considered as 'barred'. That is, this may mean that the explicit indication method takes precedence when applied. And/or, although the RedCap UE (type) supports CORESET #0(-R) in terms of bandwidth, it may be considering a case where the RedCap UE (type) is not supported for other reasons.

If a result of the explicit indication method/the implicit indication method is 'notBarred', the UE may attempt to receive SIB1(-R) through CORESET #0(-R) and continue to perform operation for cell access.

(Method 2-2)—Transmission of Cell Access Information in SIB1(-R) Transmission Step The method 2-1 has an advantage of acquiring cell access control information at the earliest possible step from a UE perspective, but may not be easy to support due to PBCH payload limitations. In such a case, CORESET #0(-R) information may be configured as a bandwidth that the RedCap UE (type) can receive, and cell access information of the RedCap UE (type) may be transmitted through SIB1(-R) (e.g., SH206 of FIG. 12).

(Method 2-3)—Transmission of Cell Access Information in SIB1(-R) Scheduling DCI Transmission Step The cell access control information of the RedCap UE (type) may be transmitted as DCI content transmitted to CORESET #0(-R) (e.g., SH204 of FIG. 12). A DCI format used in this case may be DCI format 1_0 with CRC scrambled by SI-RNTI. And/or, reserved bits of the DCI may be used. For example, barring information of three RedCap UE types may be transmitted through a 3-bit bitmap among available 15 bits. Since this method can acquire the cell access control information before receiving SIB1(-R) transmission physical downlink shared channel (PDSCH), this method has advantages over the method 2-2 in terms of power saving and cell connection time reduction. Further, this method has an advantage over the method 1-1 in terms of signaling capacity, so it is a more suitable method of transmitting barring information per RedCap UE type or transmitting additional information (e.g., frequency routing information, etc.) other than barring information.

Since the method 2-3 cannot be used for PDCCH-less SIB1(-R) transmission, when PDCCH-less SIB1(-R) is applied in a state in which the method 2-3 is configured, the UE may assume that the cell access control information is automatically transmitted to SIB1(-R) through the method 2-2.

In the above methods, the operation of the RedCap UE (type) that is 'barred' may be to stop attempting to access the corresponding cell, change the frequency, and continue performing a cell search operation. Alternatively, the Red-Cap UE (type) that is 'barred' may monitor additional information and determine a subsequent operation. The additional information may be the same information as intraFreqReselection described above. When a highest ranked cell from a UE perspective is 'barred', the RedCap UE (type) may attempt to access a new cell within the same frequency if intraFreqReselection is 'allowed', and the Red-Cap UE (type) may attempt the cell access by shifting the frequency if intraFreqReselection is 'notAllowed'.

The methods 2-1 to 2-3 may be sequentially applied for multi-stage cell barring. For example, when the $N_T$ RedCap UE types are present, each UE type may acquire the cell access control information in the time order of the method 2-1==>the method 2-3==>the method 2-2. In this instance, for reasons such as a difference in the bandwidth supported per the RedCap UE type, $M_1$ ($>=0$) UE types among the $N_T$ RedCap UE types may be 'barred' by the method 2-1, $M_3$ ($>=0$) UE types among ($N_T-M_1$) non-barred UE types may be 'barred' by the method 2-3, and $M_2$ ($>=0$) UE types among remaining ($N_T-M_1-M_3$) non-barred UE types may be 'barred' by the method 2-2. Hence, the $N_T$ RedCap UE types may be configured such that a total of $M_1+M_3+M_2$ UE types are 'barred', and ($N_T-M_1-M_3-M_2$) UE types are allowed to access ($N_T>=M_1+M_3+M_2$).

Third Embodiment

The present embodiment describes a method of indicating system information for controlling cell access of a RedCap UE.

With respect to frequency bands (for simplicity, also referred to as "NR 4-Rx band") in which a legacy NR UE shall be equipped with at least 4 Rx antenna ports, the minimum number of Rx branches for a RedCap UE has been controversial over the past few years. The decision-making RAN1 meeting was adjourned to the RAN plenary session. The main issue was whether to introduce 1-Rx RedCap UE in NR 4-Rx bands. Operators' main concerns about this issue included a loss in spectral efficiency, an impact on network planning, and an impact on specifications for recovering a coverage loss, and the like. There were also concerns raised by UE vendors from a practical perspective that all small form factor wearable solutions currently on the market are equipped with one Rx, and it is impossible to improve performance by integrating two Rxs. Accordingly, the UE vendors intend to eliminate uncertainty by extending proven 1-Rx solutions to higher NR operating bands such as the NR 4-Rx bands.

In RAN #91-e meeting, WI objectives were updated in a compromise manner in which 1-Rx and 2-Rx RedCap UEs are supported in the NR 4-Rx bands, under the condition that a mechanism is specified that allows a network to simultaneously control cell/frequency access of a RedCap UE based on the number of Rx branches. In such a way, the network can control the RedCap UE to access its cell/frequency only when the network is ready.

The relevant WI objective is to specify a system information indication indicating whether the RedCap UE can camp on the cell/frequency. A specific indication on the number of Rx branches of the UE should be possible (RAN2, RAN1).

Even if this is an objective led by RAN2, a motivation to control the cell/frequency access of the RedCap UE based on the number of Rx branches comes from a performance difference between UEs with different numbers of Rx branches. Therefore, RAN1 can discuss a method of controlling the cell/frequency access of the RedCap UE based on the number of Rx branches and provide guidance to RAN2.

If multiple RedCap UE types can be defined, the network (or base station) may indicate whether the RedCap UE can camp on the cell/frequency based on the RedCap UE types. In this case, the network may allow some RedCap UE types to camp on the cell/frequency and may not allow other RedCap UE types to camp on the cell/frequency. If the WI objective is updated to specify the definition of 'one' Red-Cap UE type in RAN #91-e meeting, the same philosophy can be applied to the control of the cell/frequency access of the RedCap UE based on the number of Rx branches. The number of Rx branches may define the RedCap UE type. In the present disclosure, the term 'Rx branch' may include 'Rx antenna port'. And/or, in the present disclosure, the 'Rx branch' may be replaced with 'Rx antenna port'. In addition, in the present disclosure, the 'network' may be referred to as the 'base station'.

The access control of the RedCap UEs based on the number of Rx branches will be described in more detail, and a level of detail for the RedCap access control may be provided depending on needs of the network. In its simplest way, the network may simply bar the RedCap access of the UE to the cell/frequency regardless of the number of Rx branches. Alternatively, the network may bar only the Red-Cap UE having one Rx branch. In this case, the motivation may be to prevent a loss in spectral efficiency of the network that may be potentially generated by the 1-Rx RedCap UE. Alternatively, the network may bar only the RedCap UE having one Rx branch only for the NR 4-Rx bands. This may be due to the fact that an expected amount of potential loss in the spectral efficiency of the network is greatest when the 1-Rx RedCap UE is introduced in the NR 4-Rx bands. In this case, the two Rx RedCap UEs may be allowed in the NR 4-Rx bands. In summary, the following alternatives may be considered as 1-bit solutions when only 1 bit (or at most 2 code points) can be used for the access control of the RedCap UE.

Methods/alternatives described below are merely distinguished for convenience of explanation. Thus, it is obvious that configuration of any method/alternative can be substituted or combined with configuration of another method/alternative.

[1-Bit Solution]

Alternative 1: barring of RedCap UE regardless of the number of Rx branches

Alternative 2: barring of 1-Rx RedCap UE

Alternative 3: barring of 1-Rx RedCap UE for NR 4-Rx bands and not barring of 1-Rx RedCap UE for NR 2-Rx bands For example, according to the alternative 2, whether to bar the 1-Rx RedCap UE in a frequency band (or cell) may be indicated/determined/configured based on the 1-bit information. For example, based on the 1-bit information (e.g., higher layer parameter 'cellBarredRedCap1Rx-r17' of SIB1 message) being set to 'barred', the 1-Rx RedCap UE may be barred in the frequency band (or cell), and the 1-Rx RedCap UE may not be barred in the frequency band (or cell) based on the 1-bit information being set to 'notBarred'.

And/or, cell status 'barred' may mean (even if a cell is an emergency call) the UE is not allowed to select/reselect the corresponding cell.

The selection among the 1-bit solutions may depend on the NR operating bands. For example, the alternative 1 may be used in the NR 2-Rx bands, and the alternative 2 may be used in the NR 4-Rx bands. This may be because the 1 Rx RedCap UEs need to be barred only in the NR 4-Rx bands.

For example, the NR 4-Rx band may mean bands n7, n38, n41, n48, n77, n78 and n79 that require the UE to be equipped with at least four antenna ports. And/or, the NR 2-Rx band may mean bands that require the UE to be equipped with at least two Rx antenna port in all the operating bands except for the bands n7, n38, n41, n48, n77, n78 and n79.

And/or, in the alternative 3, performance of the 1-Rx RedCap UE may be significantly lower than performance of 4-Rx non-RedCap UE. Further, a difference in performance between the 1-Rx RedCap UE and 2-Rx non-RedCap UE may not be relatively large. In this case, the 1-Rx RedCap UE may require barring in 4-Rx band and may not require barring in 2-Rx band. Considering this situation, the alternative 3 is a method in which even if IE of SIB equally indicates 'cellBarred', the 1-Rx RedCap UE recognizes that the cell has been barred when attempting the access in the 4-Rx band, and the 1-Rx RedCap UE recognizes that the cell is not barred or ignores 'cellBarred' when attempting the access in the 2-Rx band, and attempts the access (in the same manner as the non-RedCap UE).

So far, the 1-bit solutions have been described. When more bits or code points can be used for the access control RedCap UE, the network can enjoy more freedom in controlling the access of the RedCap UE based on the number of Rx branches. As an example of 2-bit solutions, if 2 bits are available for the access control of the RedCap UE, each code point of 2 bits may be mapped to one of the following states.

[2-Bit Solution]

"00": no barring of RedCap UE (both 1-Rx RedCap UE and 2-Rx RedCap UE are allowed)

"01": barring of 1-Rx RedCap UE (only 2-Rx RedCap UE is allowed)

"10": barring of 1-Rx and 2-Rx RedCap UEs (both 1-Rx RedCap UE and 2-Rx RedCap UE are not allowed)

"11": reserved

The selection between the 1-bit solutions and the 2-bit solutions may depend on the NR operating bands. For example, the 1-bit solution may be used for the NR 2-Rx bands, and the 2-bit solution may be used for the NR 4-Rx bands. This may be because more access control of the RedCap UE depending on the number of Rx branches is needed in the NR 4-Rx bands than in the NR 2-Rx bands. For example, solutions and/or alternatives may be selected/determined as follows.

Selection method 1:1-bit solution for NR 2 Rx bands, and 2-bit solution for NR 4 Rx bands Selection method 2: alternative 1 for NR 2 Rx bands, and alternative 2 for NR 4 Rx bands Selection method 3: alternative 2 for NR 2 Rx bands, and alternative 1 for NR 4 Rx bands For example, in the selection method 1, the alternative 1 or the alternative 2 among the 1-bit solution may be selected/ determined for the NR 2 Rx bands, and since the detailed RedCap barring depending on the number of Rx branches may be required for the NR 4 Rx bands, the 2-bit solution may be selected/determined.

And/or, in the selection method 2, only the 1-Rx RedCap UE may be barred in the NR 4-Rx bands, and all the RedCap UEs may be barred in the NR 2-Rx bands.

And/or, in the selection method 3, only the 1-Rx RedCap UE may be barred in the NR 2-Rx bands, and all the RedCap UEs may be barred in the NR 4-Rx bands. That is, the 1-Rx RedCap UE may be acceptable in the NR 2-RX bands.

A system information indication indicating whether the RedCap UE can camp on the cell/frequency may be included in SIB1 shared by the RedCap UE and the non-RedCap UE. Alternatively, the system information indication may be carried in new SIB1 (in addition to SIB1 shared with the non-RedCap UE) introduced to transmit additional system information intended for the RedCap UE. Alternatively, the system information indication may be included in new SIB1 introduced to transmit all SIB1 information required to support the cell RedCap UE, which does not require acquisition of SIB1 for the non-RedCap UE.

Assuming that the number of bits, including an indication specifying the number of Rx branches of the UE, required to indicate whether the RedCap UE can camp on the cell/frequency is small (e.g., 1 bit or 2 bits), this may be indicated in DCI scheduling the SIB1. This has an advantage of additional power saving because there is no need to receive the PDSCH carrying the SIB1.

The system information indication, including an indication specific to the number of Rx branches of the UE, indicating whether the RedCap UE can camp on the cell/frequency may depend on the NR operating bands.

The system information indication, including a specific indication for the number of Rx branches of the UE, indicating whether the RedCap UE can camp on the cell/frequency may be indicated in SIB1 for the RedCap UE or in DCI scheduling the SIB1 for the RedCap UE.

Fourth Embodiment

The present embodiment describes an operation method of a RedCap UE in a RedCap standalone (RSA) scenario.

In the RSA scenario, restriction of NR UE access can be useful from a NR UE perspective in terms of power saving or access time reduction. The present embodiment describes NR UE barring in an RSA situation and an operation of the RedCap UE in this case.

A proposal method of the present embodiment may be applied for the purpose of traffic control of the NR UE or the RedCap UE or BS maintenance even in a non-RSA situation. In the RSA situation, the NR UE barring may apply the conventional NR UE barring method. That is, barring information (CellBarred, intraFreqReselection) of MIB that has been transmitted to a part of a PBCH payload may be used for the same purposes as before. An operation of the RedCap UE is described below.

Methods described below are merely distinguished for convenience of explanation. Thus, it is obvious that configuration of any method can be substituted or combined with configuration of another method.

(Method 4-1)

If the NR UE is 'barred', that is, if cell Barred of the MIB is 'barred', the RedCap UE may check that it is an RSA cell and perform an RSA operation. The RSA operation is a predefined operation to be performed in an RSA situation. For example, the RSA operation may be used by defining/

(re-)interpreting reserved/spare bits of PBCH payload/MIB as RedCap UE dedicated bits, or may include interpreting (some of) PBCH payload bits differently from the NR UE (e.g., SIB1/SIB1-R scheduling information, whether to support the RedCap UE, RedCap UE (type) barring information, etc.).

(Method 4-2)

If the NR UE is 'barred', that is, if cell Barred of the MIB is 'barred', the RedCap UE may acquire cell access control information (e.g., barring information) through the method 2-2 and determine whether access is possible.

When the NR UE is barred, the operation of the RedCap UE may be the same as the operation described in the proposal method of the second embodiment.

(Method 4-3)

If the NR UE is 'barred', that is, if cell Barred of the MIB is 'barred', the RedCap UE may acquire cell access control information (e.g., barring information) through the method 2-3 and determine whether access is possible.

FIG. 13 is a flow chart illustrating an operation method of a RedCap UE described in the present disclosure.

Referring to FIG. 13, a RedCap UE (100/200 of FIGS. 15 to 18) may receive a master information block (MIB) from a base station (BS) through a physical broadcast channel (PBCH), in step S1301.

And/or, the MIB may include information related to a control resource set (CORESET) #0. For example, the information related to the CORESET #0 may be information representing time and/or frequency location for the CORESET #0. And/or, the CORESET #0 may be for a Type0-PDCCH common search space. For example, an SSB related content described with reference to FIGS. 8 and 9 may be referenced in a PBCH reception operation.

And/or, the MIB may be a separate MIB (e.g., MIB-R) for the RedCap UE.

For example, an operation of the RedCap UE to receive the MIB in the step S1301 may be implemented by a device of FIGS. 15 to 18. For example, referring to FIG. 16, one or more processors 102/202 may control one or more memories 104/204 and/or one or more transceivers 106/206 so as to receive the MIB.

And/or, the RedCap UE (100/200 of FIGS. 15 to 18) may receive downlink control information (DCI) from the BS based on the MIB, in step S1302.

And/or, the DCI may be received on the CORESET #0. And/or, the DCI may correspond to DCI format 1_0 with cyclic redundancy check (CRC) scrambled by system information (SI)-radio network temporary identifier (RNTI).

And/or, the DCI may include scheduling information for SIB1/PDSCH.

For example, an operation of the RedCap UE to receive the DCI in the step S1302 may be implemented by the device of FIGS. 15 to 18. For example, referring to FIG. 16, one or more processors 102/202 may control one or more memories 104/204 and/or one or more transceivers 106/206 so as to receive the DCI.

And/or, the RedCap UE (100/200 of FIGS. 15 to 18) may receive SIB1 including cell barring information from the BS based on the DCI, in step S1303.

And/or, the cell barring information may represent whether to bar a cell based on a receive (Rx) branch of the RedCap UE.

And/or, based on the RedCap UE being a UE equipped with one Rx branch, the cell may be barred for the RedCap UE. And/or, based on the RedCap UE being a UE equipped with two Rx branches, the cell may not be barred for the RedCap UE. And/or, the cell barring information may be 1-bit information.

And/or, the operation method of FIG. 13 may determine/configure whether to bar the cell based on the number of Rx branches of the RedCap UE, but whether to bar the cell may be determined/configured by classifying the UE in various methods (e.g., 2-bit solution of the third embodiment).

And/or, the cell may be included in a frequency band requiring including four Rx branches.

And/or, based on the cell being barred, a cell search may be performed by changing a frequency.

And/or, the SIB1 may be received through a physical downlink shared channel (PDSCH).

And/or, the RedCap UE may perform a random access procedure after the step S1303. For example, reference may be made to the random access procedure described with reference to FIG. 10.

And/or, the RedCap UE may transmit UE type information to the BS. For example, reference may be made to the RedCap device type classification and the method of reporting to the BS described with reference to FIG. 11.

For example, an operation of the RedCap UE to receive the SIB1 in the step S1303 may be implemented by the device of FIGS. 15 to 18. For example, referring to FIG. 16, one or more processors 102/202 may control one or more memories 104/204 and/or one or more transceivers 106/206 so as to receive the SIB1.

Since the operation of the RedCap UE described with reference to FIG. 13 is the same as the operation of the RedCap UE described with reference to FIGS. 1 to 12 (e.g., the first to fourth embodiments), a detailed operation thereof is omitted.

The signaling and the operation described above may be implemented by a device (e.g., FIGS. 15 to 18) to be described below. For example, the signaling and the operation described above may be processed by one or more processors of FIGS. 15 to 18, and the signaling and the operation described above may be stored in a memory in the form of commands/programs (e.g., instructions, executable codes) for running at least one processor of FIGS. 15 to 18.

For example, a processing apparatus configured to control a RedCap UE to receive an SIB1 in a wireless communication system may comprise at least one processor, and at least one memory operably connected to the at least one processor, wherein the at least one memory may be configured to store instructions performing operations based on being executed by the at least one processor, wherein the operations may comprise receiving an MIB from a BS through a PBCH, receiving DCI from the BS based on the MIB, and receiving the SIB1 including cell barring information from the BS based on the DCI, wherein the cell barring information may represent whether to bar a cell based on a Rx branch of the RedCap UE, wherein based on the RedCap UE being a UE equipped with one Rx branch, the cell may be barred for the RedCap UE, and wherein based on the RedCap UE being a UE equipped with two Rx branches, the cell may not be barred for the RedCap UE.

For example, in a computer readable storage medium storing at least one instruction, the at least one instruction may be configured to allow at least one processor to control operations based on being executed by the at least one processor, and the operations may comprise receiving an MIB from a BS through a PBCH, receiving DCI from the BS based on the MIB, and receiving an SIB1 including cell barring information from the BS based on the DCI, wherein the cell barring information may represent whether to bar a cell based on a Rx branch of the RedCap UE, wherein based on the RedCap UE being a UE equipped with one Rx branch, the cell may be barred for the RedCap UE, and wherein based on the RedCap UE being a UE equipped with two Rx branches, the cell may not be barred for the RedCap UE.

FIG. 14 is a flow chart illustrating an operation method of a base station described in the present disclosure.

Referring to FIG. 14, a base station (BS) (100/200 of FIGS. 15 to 18) may transmit a master information block (MIB) to a RedCap UE through a physical broadcast channel (PBCH), in step S1401.

And/or, the MIB may include information related to a control resource set (CORESET) #0. For example, the information related to the CORESET #0 may be information representing time and/or frequency location for the CORESET #0. And/or, the CORESET #0 may be for a Type0-PDCCH common search space. For example, an SSB related content described with reference to FIGS. 8 and 9 may be referenced in a PBCH transmission operation.

And/or, the MIB may be a separate MIB (e.g., MIB-R) for the RedCap UE.

For example, an operation of the BS to transmit the MIB in the step S1401 may be implemented by a device of FIGS. 15 to 18. For example, referring to FIG. 16, one or more processors 102/202 may control one or more memories 104/204 and/or one or more transceivers 106/206 so as to transmit the MIB.

And/or, the BS (100/200 of FIGS. 15 to 18) may transmit downlink control information (DCI) to the RedCap UE based on the MIB, in step S1402.

And/or, the DCI may be transmitted on the CORESET #0. And/or, the DCI may correspond to DCI format 1_0 with cyclic redundancy check (CRC) scrambled by system information (SI)-radio network temporary identifier (RNTI).

And/or, the DCI may include scheduling information for SIB1/PDSCH.

For example, an operation of the BS to transmit the DCI in the step S1402 may be implemented by the device of FIGS. 15 to 18. For example, referring to FIG. 16, one or more processors 102/202 may control one or more memories 104/204 and/or one or more transceivers 106/206 so as to transmit the DCI.

And/or, the BS (100/200 of FIGS. 15 to 18) may transmit SIB1 including cell barring information to the RedCap UE based on the DCI, in step S1403.

And/or, the cell barring information may represent whether to bar a cell based on a receive (Rx) branch of the RedCap UE.

And/or, based on the RedCap UE being a UE equipped with one Rx branch, the cell may be barred for the RedCap UE. And/or, based on the RedCap UE being a UE equipped with two Rx branches, the cell may not be barred for the RedCap UE. And/or, the cell barring information may be 1-bit information.

And/or, the operation method of FIG. 13 may determine/configure whether to bar the cell based on the number of Rx branches of the RedCap UE, but whether to bar the cell may be determined/configured by classifying the UE in various methods (e.g., 2-bit solution of the third embodiment).

And/or, the cell may be included in a frequency band requiring including four Rx branches.

And/or, based on the cell being barred, a cell search may be performed by changing a frequency.

And/or, the SIB1 may be transmitted through a physical downlink shared channel (PDSCH).

And/or, the BS may perform a random access procedure after the step S1403. For example, reference may be made to the random access procedure described with reference to FIG. 10.

And/or, the BS may receive UE type information from the RedCap UE. For example, reference may be made to the RedCap device type classification and the method of reporting to the BS described with reference to FIG. 11.

For example, an operation of the BS to transmit the SIB1 in the step S1403 may be implemented by the device of FIGS. 15 to 18. For example, referring to FIG. 16, one or more processors 102/202 may control one or more memories 104/204 and/or one or more transceivers 106/206 so as to transmit the SIB1.

Since the operation of the BS described with reference to FIG. 14 is the same as the operation of the BS described with reference to FIGS. 1 to 13 (e.g., the first to fourth embodiments), a detailed operation thereof is omitted.

The signaling and the operation described above may be implemented by a device (e.g., FIGS. 15 to 18) to be described below. For example, the signaling and the operation described above may be processed by one or more processors of FIGS. 15 to 18, and the signaling and the operation described above may be stored in a memory in the form of commands/programs (e.g., instructions, executable codes) for running at least one processor of FIGS. 15 to 18.

For example, a processing apparatus configured to control a base station to transmit an SIB1 in a wireless communication system may comprise at least one processor, and at least one memory operably connected to the at least one processor, wherein the at least one memory may be configured to store instructions performing operations based on being executed by the at least one processor, wherein the operations may comprise transmitting an MIB to a RedCap UE through a PBCH, transmitting DCI to the RedCap UE based on the MIB, and transmitting the SIB1 including cell barring information to the RedCap UE based on the DCI, wherein the cell barring information may represent whether to bar a cell based on a Rx branch of the RedCap UE, wherein based on the RedCap UE being a UE equipped with one Rx branch, the cell may be barred for the RedCap UE, and wherein based on the RedCap UE being a UE equipped with two Rx branches, the cell may not be barred for the RedCap UE.

For example, in a computer readable storage medium storing at least one instruction, the at least one instruction may be configured to allow at least one processor to control operations based on being executed by the at least one processor, and the operations may comprise transmitting an MIB to a RedCap UE through a PBCH, transmitting DCI to the RedCap UE based on the MIB, and transmitting an SIB1 including cell barring information to the RedCap UE based on the DCI, wherein the cell barring information may represent whether to bar a cell based on a Rx branch of the RedCap UE, wherein based on the RedCap UE being a UE equipped with one Rx branch, the cell may be barred for the RedCap UE, and wherein based on the RedCap UE being a UE equipped with two Rx branches, the cell may not be barred for the RedCap UE.

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 15 shows a communication system 1 based on an embodiment of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device to which the Present Disclosure is Applied

FIG. 16 illustrates wireless devices based on an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) based on the descriptions, functions, procedures, proposals, methods, and/or operational flowcharts disclosed in this document. The one or more processors 102 and 202 may generate messages, control information, data, or information based on the descriptions, functions, procedures, proposals, methods, and/or operational flowcharts disclosed in this document. The one or more processors 102 and 202 may generate signals (e.g., baseband signals) including PDUs, SDUs, messages, control information, data, or information based on the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information based on the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Application Example of Wireless Device to which the Present Disclosure is Applied FIG. 17 illustrates another example of a wireless device based on an embodiment of the present disclosure. The wireless device may be implemented in various forms based on a use-case/service.

Referring to FIG. 17, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured based on types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place based on a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Mobile Device to which the Present Disclosure is Applied

FIG. 18 shows a hand-held device based on an embodiment of the present disclosure. The hand-held device may include a smartphone, a smart pad, a wearable device (e.g., a smart watch or a smart glasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 18, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 17, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

A wireless communication technology implemented by a wireless device (e.g., 100, 200) according to the present disclosure may include narrowband Internet of Things for low power communication in addition to LTE, NR and 6G. In this case, for example, the NB-IoT technology may be an example of a low power wide area network (LPWAN) technology and may be implemented by standards such as LTE Cat NB1 and/or LTE Cat NB2, and the present disclosure is not limited to the aforementioned names. Additionally or alternatively, the wireless communication technology implemented by the wireless device (e.g., 100, 200) according to the present disclosure may perform communication based on the LTE-M technology. In this case, for example, the LTE-M technology may be an example of the LPWAN technology and may be called various names, such as enhanced Machine Type Communication (eMTC). For example, the LTE-M technology may be implemented by at least one of various standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and the present disclosure is not limited to the aforementioned names. Additionally or alternatively, the wireless communication technology implemented by the wireless device (e.g., 100, 200) according to the present disclosure may include at least one of ZigBee, Bluetooth and a low power wide area network (LPWAN) in which low power communication is considered, and the present disclosure is not limited to the aforementioned names. For example, the ZigBee technology may generate personal area networks (PAN) related to small/low-power digital communication based on various standards such as IEEE 802.15.4, and may be called various names.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the above detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although a method of transmitting and receiving a SIB1 in a wireless communication system according to the present disclosure has been described focusing on examples applying to the 3GPP LTE/LTE-A system and 5G system (new RAT system), the present disclosure can be applied to various wireless communication systems, such as beyond 5G, 6G, and beyond 6G, in addition to the systems described above.

What is claimed is:

1. A method of receiving, by a reduced capability (Red-Cap) user equipment (UE), a system information block 1 (SIB1) in a wireless communication system, the method comprising:
   receiving a master information block (MIB) from a base station (BS) through a physical broadcast channel (PBCH);
   receiving downlink control information (DCI) from the BS based on the MIB; and
   receiving the SIB1 including cell barring information from the BS based on the DCI,
   wherein the cell barring information represents whether to bar a cell based on a receive (Rx) branch of the RedCap UE,
   wherein based on the RedCap UE being a UE equipped with one Rx branch, the cell is barred for the RedCap UE,
   wherein based on the RedCap UE being a UE equipped with two Rx branches, the cell is not barred for the RedCap UE,
   wherein the cell barring information is configured to take one of two values indicating a barred state and a not barred state for the RedCap UE equipped with the one Rx branch,
   wherein, based on the cell barring information indicating the barred state, the cell is identified by the RedCap UE equipped with the one Rx branch as barred when the cell is included in a four receive branch band, and the cell is identified by the RedCap UE equipped with the one Rx branch as not barred when the cell is included in a two receive branch band, and
   wherein the four receive branch band requires a non-reduced capability UE to be equipped with at least four receive antenna ports, and the two receive branch band requires a non-reduced capability UE to be equipped with at least two receive antenna ports.

2. The method of claim 1, wherein the cell barring information is 1-bit information.

3. The method of claim 1, wherein based on the cell being barred, a cell search is performed by changing a frequency.

4. The method of claim 1, wherein the MIB includes information related to a control resource set (CORESET) #0.

5. The method of claim 4, wherein the DCI is received on the CORESET #0.

6. The method of claim 5, wherein the DCI is related to DCI format 1 0 with cyclic redundancy check (CRC) scrambled by system information (SI)-radio network temporary identifier (RNTI).

7. The method of claim 6, wherein the SIB1 is received through a physical downlink shared channel (PDSCH).

8. A reduced capability (RedCap) user equipment (UE) configured to receive a system information block 1 (SIB1) in a wireless communication system, the RedCap UE comprising:
   at least one transceiver;
   at least one processor; and
   at least one memory operably connected to the at least one processor,
   wherein the at least one memory is configured to store instructions performing operations based on being executed by the at least one processor, wherein the operations comprise:

receiving a master information block (MIB) from a base station (BS) through a physical broadcast channel (PBCH);

receiving downlink control information (DCI) from the BS based on the MIB; and receiving the SIB1 including cell barring information from the BS based on the DCI, wherein the cell barring information represents whether to bar a cell based on a receive (Rx) branch of the RedCap UE, wherein based on the RedCap UE being a UE equipped with one Rx branch, the cell is barred for the RedCap UE, wherein based on the RedCap UE being a UE equipped with two Rx branches, the cell is not barred for the RedCap UE, wherein the cell barring information is configured to take one of two values indicating a barred state and a not barred state for the RedCap UE equipped with the one Rx branch, wherein, based on the cell barring information indicating the barred state, the cell is identified by the RedCap UE equipped with the one Rx branch as barred when the cell is included in a four receive branch band, and the cell is identified by the RedCap UE equipped with the one Rx branch as not barred when the cell is included in a two receive branch band, and wherein the four receive branch band requires a non-reduced capability UE to be equipped with at least four receive antenna ports, and the two receive branch band requires a non-reduced capability UE to be equipped with at least two receive antenna ports.

9. A method of transmitting, by a base station (BS), a system information block 1 (SIB1) in a wireless communication system, the method comprising:

transmitting a master information block (MIB) to a reduced capability (RedCap) user equipment (UE) through a physical broadcast channel (PBCH);

transmitting downlink control information (DCI) to the RedCap UE based on the MIB; and transmitting the SIB1 including cell barring information to the RedCap UE based on the DCI, wherein the cell barring information represents whether to bar a cell based on a receive (Rx) branch of the RedCap UE, wherein based on the RedCap UE being a UE equipped with one Rx branch, the cell is barred for the RedCap UE, wherein based on the RedCap UE being a UE equipped with two Rx branches, the cell is not barred for the RedCap UE, wherein the cell barring information is configured to take one of two values indicating a barred state and a not barred state for the RedCap UE equipped with the one Rx branch, wherein, based on the cell barring information indicating the barred state, the cell is identified by the RedCap UE equipped with the one Rx branch as barred when the cell is included in a four receive branch band, and the cell is identified by the RedCap UE equipped with the one Rx branch as not barred when the cell is included in a two receive branch band, wherein the four receive branch band requires a non-reduced capability UE to be equipped with at least four receive antenna ports, and the two receive branch band requires a non-reduced capability UE to be equipped with at least two receive antenna ports.

10. The method of claim 9, wherein the cell barring information is 1-bit information.

11. The method of claim 9, wherein based on the cell being barred, a cell search is performed by changing a frequency.

12. The method of claim 9, wherein the MIB includes information related to a control resource set (CORESET) #0.

13. The method of claim 12, wherein the DCI is transmitted on the CORESET #0.

14. The method of claim 13, wherein the DCI is related to DCI format 1 0 with cyclic redundancy check (CRC) scrambled by system information (SI)-radio network temporary identifier (RNTI).

15. The method of claim 14, wherein the SIB1 is transmitted through a physical downlink shared channel (PDSCH).

* * * * *